(12) United States Patent
Ng et al.

(10) Patent No.: US 11,196,460 B2
(45) Date of Patent: Dec. 7, 2021

(54) COMP MEASUREMENT SYSTEM AND METHOD

(71) Applicant: Samsung Electronics Co., Ltd., Suwon-si (KR)

(72) Inventors: Boon Loong Ng, Plano, TX (US); Gerardus Johannes Petrus van Lieshout, Apeldoorn (NL); Young-Han Nam, Plano, TX (US); Himke van der Velde, Zwolle (NL); Jianzhong Zhang, Plano, TX (US); Ying Li, Richardson, TX (US); Younsun Kim, Kyounggi (KR); Krishna Sayana, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 16/585,987

(22) Filed: Sep. 27, 2019

(65) Prior Publication Data

US 2020/0028543 A1 Jan. 23, 2020

Related U.S. Application Data

(63) Continuation of application No. 15/005,973, filed on Jan. 25, 2016, now Pat. No. 10,498,404, which is a (Continued)

(51) Int. Cl.
*H04B 7/024* (2017.01)
*H04L 1/00* (2006.01)
*H04B 7/06* (2006.01)

(52) U.S. Cl.
CPC ........... *H04B 7/024* (2013.01); *H04L 1/0026* (2013.01); *H04L 1/0077* (2013.01); *H04B 7/0632* (2013.01)

(58) Field of Classification Search
CPC ......... H04L 47/10; H04L 43/00; H04L 43/50; H04L 43/0852; H04L 12/2697;
(Continued)

(56) References Cited

U.S. PATENT DOCUMENTS 7,916,807 B2 3/2011 Aldana
8,767,581 B2 7/2014 Yamada
(Continued)

FOREIGN PATENT DOCUMENTS

CN 101965004 A 2/2011
CN 102160442 A 8/2011
(Continued)

OTHER PUBLICATIONS

The First Office Action in connection with Chinese Application No. 201710308886.X dated May 29, 2020, 17 pages.
(Continued)

*Primary Examiner* — Warner Wong

(57) ABSTRACT

A subscriber station configured to communicate with one or more base stations or other transmission points (TPs) in a wireless communication network is configured to receive, from the network, information associated with one or more of the TPs that are candidates for coordinated multipoint (CoMP) transmission with the subscriber station, to measure a plurality of channel quality values for each of the one or more TPs, and to report the measured channel quality values to the network.

20 Claims, 10 Drawing Sheets

Related U.S. Application Data continuation of application No. 13/624,759, filed on Sep. 21, 2012, now Pat. No. 9,246,558.

(60) Provisional application No. 61/539,419, filed on Sep. 26, 2011, provisional application No. 61/596,057, filed on Feb. 7, 2012, provisional application No. 61/651,934, filed on May 25, 2012, provisional application No. 61/658,800, filed on Jun. 12, 2012.

(58) Field of Classification Search
CPC ....... H04L 1/00; H04L 1/0001; H04L 1/0076; H04L 1/0077; H04L 1/0023; H04L 1/0026; H04B 7/00; H04B 7/02; H04B 7/022; H04B 7/024; H04B 7/0617; H04B 7/0621; H04B 7/0632
See application file for complete search history.

(56) References Cited

U.S. PATENT DOCUMENTS

| | | |
|---|---|---|
| 9,379,960 B2 | 6/2016 | Ihm et al. |
| 10,084,651 B2 | 9/2018 | Chai |
| 2010/0238821 A1 | 9/2010 | Liu et al. |
| 2010/0246469 A1 | 9/2010 | Gheorghiu et al. |
| 2011/0110251 A1 | 5/2011 | Krishnamurthy et al. |
| 2011/0149886 A1 | 6/2011 | Xu et al. |
| 2011/0170496 A1 | 7/2011 | Fong et al. |
| 2011/0194551 A1 | 8/2011 | Lee et al. |
| 2011/0218016 A1 | 9/2011 | Hirakawa et al. |
| 2011/0292847 A1 | 12/2011 | Yoon et al. |
| 2012/0020230 A1 | 1/2012 | Chen et al. |
| 2012/0108253 A1 | 5/2012 | Mao et al. |
| 2013/0003788 A1 | 1/2013 | Marinier et al. |
| 2013/0040578 A1 | 2/2013 | Khoshnevis et al. |
| 2013/0089159 A1 | 4/2013 | Liu |
| 2013/0196699 A1* | 8/2013 | Davydov .......... H04W 52/0216 455/500 |
| 2013/0260741 A1 | 10/2013 | Yamada |
| 2013/0272158 A1 | 10/2013 | Park et al. |
| 2013/0315197 A1 | 11/2013 | Park et al. |
| 2013/0344868 A1 | 12/2013 | Yamada |
| 2013/0344869 A1 | 12/2013 | Yamada |
| 2014/0112184 A1 | 4/2014 | Chai |
| 2014/0153526 A1* | 6/2014 | Mazzarese ............. H04B 7/024 370/329 |
| 2014/0226509 A1 | 8/2014 | Ko et al. |
| 2014/0286291 A1* | 9/2014 | Einhaus .................. H04B 7/024 370/329 |
| 2014/0348096 A1* | 11/2014 | Nagata .............. H04W 72/1247 370/329 |
| 2015/0049615 A1* | 2/2015 | Wang .................... H04W 24/10 370/241 |
| 2015/0139005 A1* | 5/2015 | Tsuboi .................. H04L 5/0053 370/252 |
| 2015/0163745 A1 | 6/2015 | Kim et al. |
| 2015/0189527 A1 | 7/2015 | Wang et al. |
| 2015/0208263 A1* | 7/2015 | Behravan .............. H04L 5/0057 370/252 |

FOREIGN PATENT DOCUMENTS

| | | |
|---|---|---|
| EP | 2306769 A1 | 4/2011 |
| JP | 2010154399 A | 7/2010 |
| WO | 2010048437 A2 | 4/2010 |
| WO | 2011057037 A2 | 5/2011 |
| WO | 2011085189 A1 | 7/2011 |
| WO | 2013166709 A1 | 11/2013 |
| WO | 2013170713 A1 | 11/2013 |

OTHER PUBLICATIONS

International Search Report dated Feb. 26, 2013 in connection with International Patent Application No. PCT/KR2012/007770, 3 pages.
Extended European Search Report dated May 22, 2015 in connection with European Patent Application No. 12835934.6, 8 pages.
First Office Action dated Apr. 6, 2016 in connection with Chinese Application No. 2012800469704, 15 pages.
Notification of Reasons for Refusal dated Jun. 27, 2016 in connection with Japanese Application No. 2014-533199, 9 pages.
Foreign Communication From a Related Counterpart Application, European Application No. 12835934.6-1874, Communication Pursuant to Article 94(3) EPC dated Mar. 17, 2017, 7 pages.
Korean Intellectual Property Office Office Action dated Aug. 13, 2019 regarding Application No. 10-2019-7019054, 10 pages.
3GPP TS 36.331 v10.2.0; 3GPP TSG RAN E-UTRA; "Radio Resource Control; Protocol Specification"; Release 10; Jun. 24, 2011; 295 pages.
Catt, Impact of CoMP on Control Plane, 3GPP TSG RAN WGW Meeting #67, R2-094330, Shenzhen, China, Aug. 24-28, 2009, 6 pages.
Samsung, "Discussion on CoMP Resource Management Procedure", 3GPP TSG-RAN WG2 #78 Meeting, R2-122739, Prague, Czech Republic, May 21-25, 2012, 5 pages.
Samsung, "Summary of Email Discussion on Specification Impacts of CoMP", 3GPP TSG RAN WG1 #66, R1-112513, Athens, Greece, Aug. 22-26, 2011, 10 pages.
3GPP TS 32.214 v10.1.0, "3rd Generation Partnership Project, Technical Specification Group Radio Access Network; Evolved Universal Terrestrial Radio Access (E-UTRA); Physical layer; Measurements", Release 10, Mar. 29, 2011, 13 pages.
3GPP TS 36.331 v10.3.0, "3rd Generation Partnership Project, Technical Specification Group Radio Access Network; Evolved Universal Terrestrial Radio Access (E-UTRA); Radio Resource Control (RRC); Protocol Specification", Release 10, Sep. 2011, 296 pages.
3GPP TS 32.401 v10.0.0, "3rd Generation Partnership Project, Technical Specification Group Services and Systems Aspects, Telecommunication Management, Performance Management (PM), Concepts and Requirements", Release 10, Sep. 2010, 29 pages.
3GPP TS 36.214 v10.1.0; 3GPP TSG RAN E-UTRA; "Physical Layer; Measurements"; Release 10; Mar. 29, 2011; 13 pp.
3GPP TR 36.819, "3rd Generation Partnership Project; Technical Specification Group Radio Access Network; Coordinated Multi-Point Operation for LTE Physical Layer Aspects (Release 11)," V2.0.0, Sep. 2011, 70 pages.
Huawei et al., "Text proposal for standard impacts and design principles of CoMP in Rel-11", 3GPP TSG RAN WG1 Meeting #66, R1-112042, Aug. 2011, 10 pages.
ZTE, "Views on Rel-11 CoMP", 3GPP TSG RAN WG1 Meeting #63bis, R1-110172, Jan. 2011, 3 pages.
Samsung, "Indication and Determination of CSI-RS Configuration", 3GPP TSG RAN WG1 #62, R1-104597, Aug. 2010, 4 pages.

\* cited by examiner

COMP MEASUREMENT SYSTEM AND METHOD

CROSS-REFERENCE TO RELATED APPLICATION(S) AND CLAIM OF PRIORITY

The present application is a continuation of U.S. Non-Provisional patent application Ser. No. 15/005,973 filed Jan. 25, 2016 and entitled "CoMP MEASUREMENT SYSTEM AND METHOD," now U.S. Pat. No. 10,498,404, which is a continuation of U.S. Non-Provisional patent application Ser. No. 13/624,759 filed Sep. 21, 2012 and entitled "CoMP MEASUREMENT SYSTEM AND METHOD," now U.S. Pat. No. 9,246,558, which claims priority to U.S. Provisional Patent Application No. 61/539,419 filed Sep. 26, 2011 and entitled "CoMP MEASUREMENT," U.S. Provisional Patent Application No. 61/596,057 filed Feb. 7, 2012 and entitled "CoMP MEASUREMENT," U.S. Provisional Patent Application No. 61/651,934 filed May 25, 2012 and entitled "CoMP MEASUREMENT," and U.S. Provisional Patent Application No. 61/658,800 filed Jun. 12, 2012 and entitled "CoMP MEASUREMENT." The content of the above-identified patent documents is incorporated herein by reference.

TECHNICAL FIELD

The present application relates generally to wireless communications and, more specifically, to coordinated multipoint transmission and reception in wireless communications networks.

BACKGROUND

In a wireless communications network, multiple cells or base stations (also referred to as "eNBs") use frequency bands and standardized codebooks for precoding transmission to their respective user equipments (UEs), using multiple transmit antennas. A typical problem of this procedure occurs where several cells or base stations are serving their intended UEs while interfering with each other's signal. This scenario is called "inter-cell interference." Inter-cell interference constrains the throughput of the wireless network.

SUMMARY

According to one embodiment, a subscriber station configured to communicate with one or more base stations in a wireless communication network is provided. The subscriber station is configured to receive, from the network, information associated with one or more of the transmission points (TPs) that are candidates for coordinated multipoint (CoMP) transmission with the subscriber station, measure a plurality of channel quality values for each of the one or more TPs, and report to the network, the measured channel quality values.

According to another embodiment, a method for communicating with one or more base stations in a wireless communication network is provided. The method includes receiving from the network, information associated with one or more of the TPs that are candidates for coordinated multipoint (CoMP) transmission with the subscriber station, measuring a plurality of channel quality values for each of the one or more TPs, and reporting to the network, the measured channel quality values.

According to another embodiment, a base station configured to communicate with one or more subscriber stations through a plurality of transmission points (TPs) in a wireless communication network is provided. The base station is configured to receive from one of the subscriber stations, channel quality values associated with a plurality of candidate TPs measured by the subscriber station, information associated with the candidate TPs received by the subscriber station from the network, determine two or more TPs for CoMP transmission using the received channel quality values, and establish CoMP transmission with the one subscriber station using the determined TPs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated into the present disclosure as if fully set forth herein: 3GPP RP-101425, "New work item proposal: UE Conformance Test Aspects—MBMS in LTE," Dec. 7-10, 2010 ("REF1"); and R1-112851, Draft of 3GPP Technical Specification No. 36.819, version 1.1.0 (2011-08) ("REF2").

Figure 1:
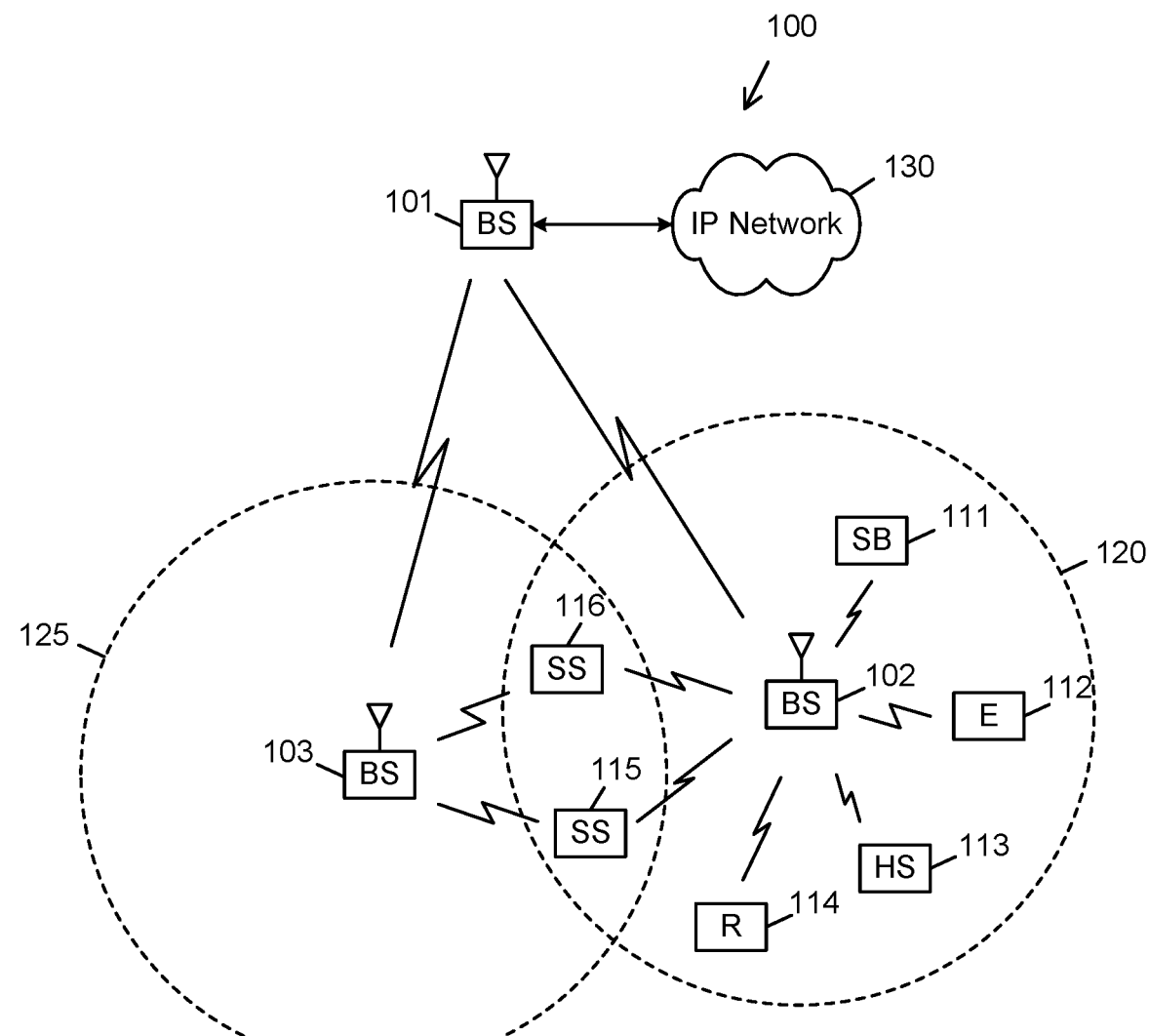
FIG. 1 illustrates an example wireless network according to embodiments of the present disclosure.

FIG. 1 illustrates an example wireless network 100 according to embodiments of the present disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network. In certain embodiments, either eNB 101, 102, or 103 controls the cells of the other eNBs 101, 102, or 103 for facilitating coordinated multipoint (CoMP) transmission.

Depending on the network type, other well-known terms may be used instead of "eNodeB," such as "base station" or "access point." For the sake of convenience, the term "eNodeB" shall be used herein to refer to the network infrastructure components that provide wireless access to remote terminals. In addition, the term user equipment (UE) is used herein to refer to remote terminals that can be used by a consumer to access services via the wireless communications network. Other well-known terms for the remote terminals include "mobile stations" and "subscriber stations."

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which can be a mobile device, such as a cell phone, a wireless laptop, a wireless PDA, or the like. UEs 111-116 can be any wireless communication device, such as, but not limited to, a mobile phone, mobile PDA and any mobile station (MS).

For the sake of convenience, the term "user equipment" or "UE" is used herein to designate any remote wireless equipment that wirelessly accesses an eNB, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 103 provides wireless broadband access to a second plurality of UEs within coverage area 125 of eNB 103. The second plurality of UEs includes UE 115 and UE 116. In some embodiment, eNBs 101-103 can communicate with each other and with UEs 111-116 using LTE or LTE-A techniques.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, can have other shapes, including irregular shapes, depending upon the configuration of the base stations and variations in the radio environment associated with natural and man-made obstructions.

Although FIG. 1 depicts one example of a wireless network 100, various changes can be made to FIG. 1. For example, another type of data network, such as a wired network, can be substituted for wireless network 100. In a wired network, network terminals can replace eNBs 101-103 and UEs 111-116. Wired connections can replace the wireless connections depicted in FIG. 1.

Figure 2A:
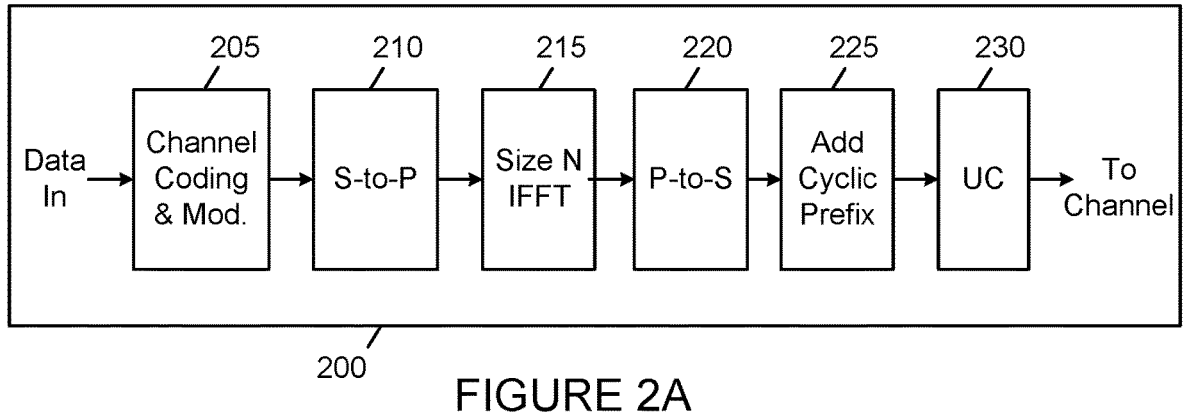
FIG. 2A is a high-level diagram of a wireless transmit path according to embodiments of the present disclosure.
Figure 2B:
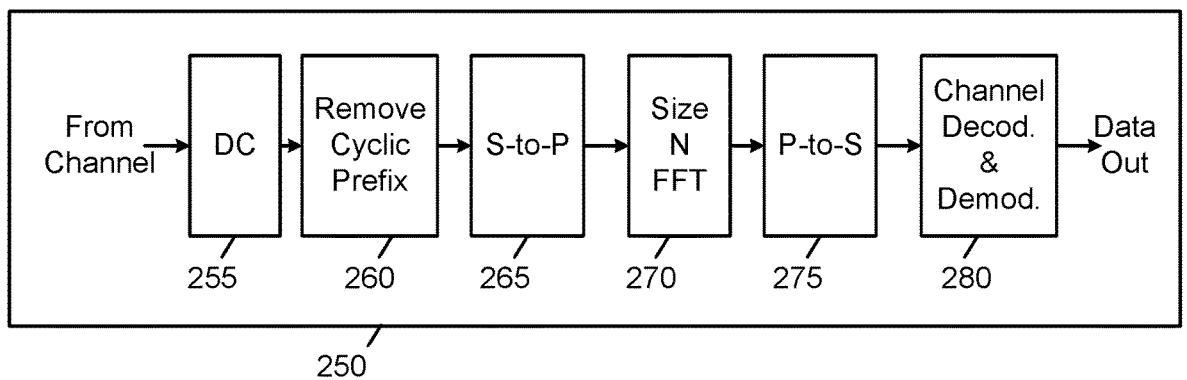
FIG. 2B is a high-level diagram of a wireless receive path according to embodiments of the present disclosure.

FIG. 2A is a high-level diagram of a wireless transmit path. FIG. 2B is a high-level diagram of a wireless receive path. In FIGS. 2A and 2B, the transmit path 200 can be implemented, e.g., in eNB 102 and the receive path 250 can be implemented, e.g., in a UE, such as UE 116 of FIG. 1. It will be understood, however, that the receive path 250 could be implemented in an eNB (e.g., eNB 102 of FIG. 1) and the transmit path 200 could be implemented in a UE.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B can be implemented in software while other components can be implemented by configurable hardware (e.g., a processor) or a mixture of software and configurable hardware. In particular, it is noted that the FFT blocks and the IFFT blocks described in this disclosure document can be implemented as configurable software algorithms, where the value of Size N can be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable can be any integer number (i.e., 1, 2, 3, 4, etc.), while for FFT and IFFT functions, the value of the N variable can be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal can also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 can implement a transmit path that is analogous to transmitting in the downlink to UEs 111-116 and can implement a receive path that is analogous to receiving in the uplink from UEs 111-116. Similarly, each one of UEs 111-116 can implement a transmit path corresponding to the architecture for transmitting in the uplink to eNBs 101-103 and can implement a receive path corresponding to the architecture for receiving in the downlink from eNBs 101-103.

Figure 3:
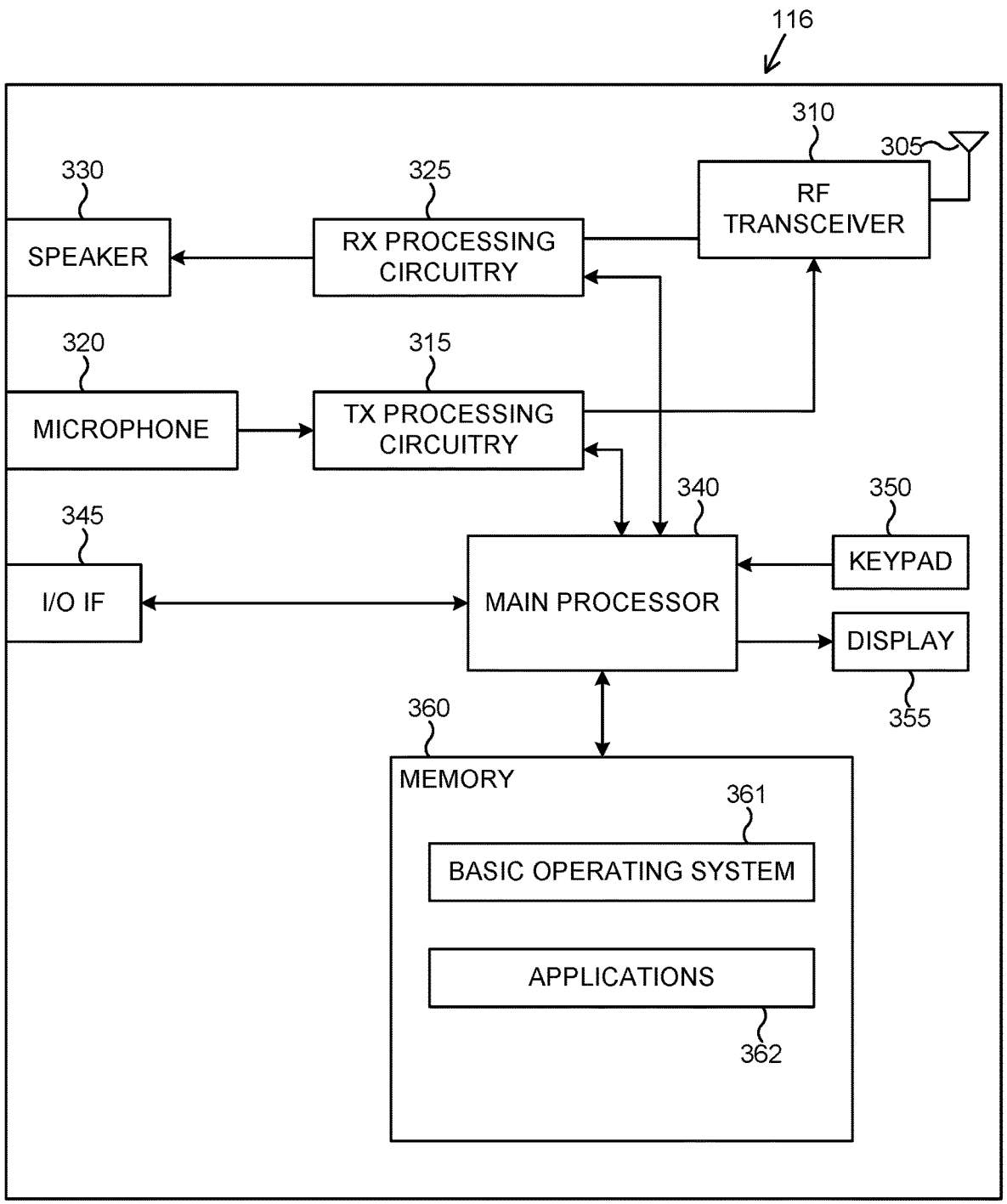
FIG. 3 illustrates a subscriber station according to embodiments of the present disclosure.

FIG. 3 illustrates a subscriber station according to embodiments of the present disclosure. The embodiment of subscriber station (UE 116) illustrated in FIG. 3 is for illustration only. Other embodiments of the wireless subscriber station could be used without departing from the scope of this disclosure.

UE 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for coordinated multipoint (CoMP) communications and determining sync signals. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 can be a liquid crystal display capable of rendering text and/or at least limited graphics from web sites. Alternate embodiments can use other types of displays.

Figure 4A:
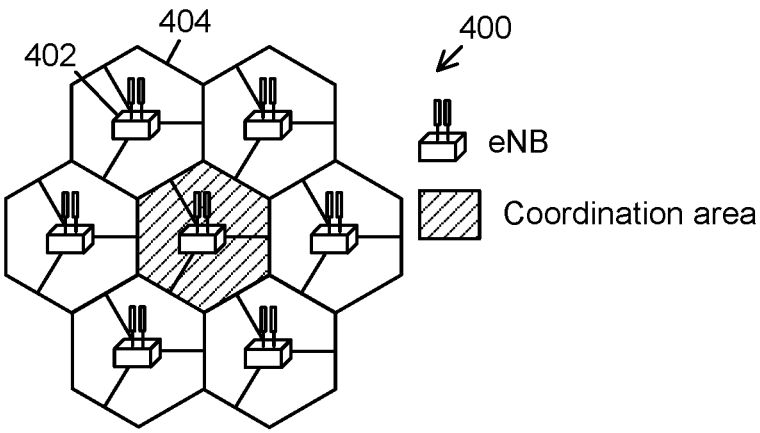
FIGS. 4A through 4C illustrate example networks according to embodiments of the present disclosure.
Figure 4B:
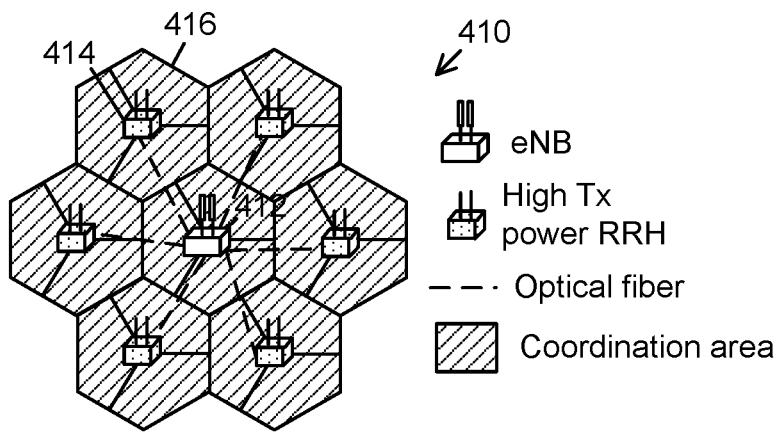
Figure 4C:
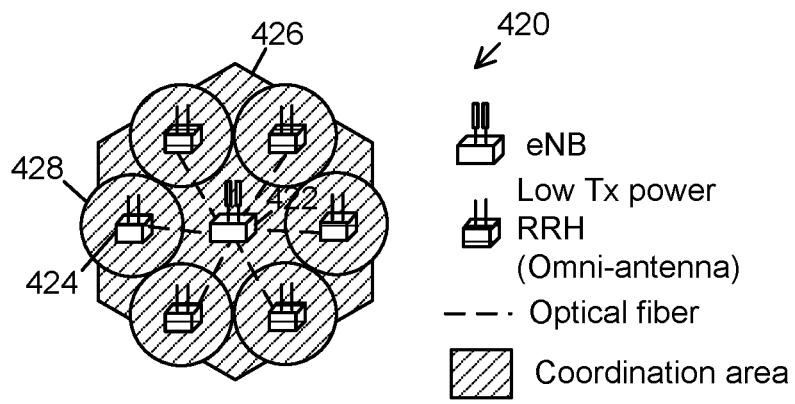

FIGS. 4A through 4C illustrate example network topologies that may be configured to operate according to a coordinated multipoint (CoMP) transmission according to embodiments of the present disclosure.

FIG. 4A illustrates an example homogeneous network 400 that is configured to operate with intra-site CoMP. Homogeneous network 400 includes a number of base stations 402 that each administers or coordinates a corresponding number of cells 404, which in the particular embodiment shown is three cells. The cell 404 of each base station 402 coordinates its own cell 404. That is, each base station manages active UEs in its cell independently of other base stations 402.

FIG. 4B illustrates an example homogeneous network 410 that includes a controlling base station 412, such as an eNB, and multiple high power RRH transceivers 414. Like the homogeneous network 400 of FIG. 4A, the base station 412 and each of the RRH transceivers 414 transmit and receive wireless signaling to UEs in their respective cells 416. The homogeneous network 410 differs from the homogeneous network 400 of FIG. 4A, however, in that administration of UEs served by the network are centrally controlled by base station 412.

FIG. 4C illustrates an example heterogeneous network 420 that includes a macro base station 422 and multiple low power RRH transceivers 424. The macro base station 422 administers and coordinates UEs in its cell, which is commonly referred to as a macro cell 426. Additionally, the low power RRH transceivers each administers and coordinates UEs in their individual cells, which is commonly referred to as pico cells 428. Nevertheless, UEs in the pico cell 428 generally are located within the geographical extent of the macro cell 426.

In certain embodiments, the RRH transceivers 424 have their own individual cell IDs such that they individually serve a UE in their respective pico cell. In other embodiments, the RRH transceivers 424 use the cell IDs of the macro base station 422. In this case, the whole coordinated area of TPs sharing the same cell ID is considered as a single cell.

According to embodiments of the present disclosure, the networks 400, 410, and 420 described above provide a CoMP transmission that is categorized into one or more categories. One category includes Joint Processing (JP) in which data for a UE is available at more than one point in the CoMP cooperating set for a time-frequency resource. The JP category can include Joint Transmission (JT) with simultaneous data transmission from multiple points (e.g., part of or entire CoMP cooperating set) to a single UE or multiple UEs in a time-frequency resource. With JT, data to a UE is simultaneously transmitted from multiple points, such as to coherently or non-coherently improve the received signal quality and/or data throughput. The JP category can also include dynamic point selection (DPS)/muting with data transmission from one point (within the CoMP cooperating set) in a time-frequency resource. The transmitting/muting point can change from one subframe to another including varying over the RB pairs within a subframe. Data is available simultaneously at multiple points. In certain embodiments, this includes Dynamic cell selection (DCS). In some cases, DPS can be combined with JT in which case multiple points can be selected for data transmission in the time-frequency resource.

Another category includes Coordinated Scheduling/Beamforming (CS/CB) in which data for a UE is only available at and transmitted from one point in the CoMP cooperating set (DL data transmission is done from that point) for a time-frequency resource but user scheduling/beamforming decisions are made with coordination among points corresponding to the CoMP cooperating set. The transmitting points are chosen semi-statically. The CS/CB category also includes semi-static point selection (SSPS) with transmission to a specific UE from one point at a time. In certain embodiments, the transmitting point only changes in a semi-static manner. Muting is applied in dynamic and semi-static manner with transmission schemes above.

Another category includes a hybrid combination of JP and CS/CB. Data for a UE is available only in a subset of points in the CoMP cooperating set for a time-frequency resource but user scheduling/beamforming decisions are made with coordination among points corresponding to the CoMP cooperating set. For example, some points in the cooperating set transmit data to the target UE according to JP while other points in the cooperating set perform CS/CB.

According to embodiments of the present disclosure, the networks 400, 410, and 420 described above provide one or more differing types of CoMP sets. One particular type of CoMP set include a CoMP cooperating set in which a set of (geographically separated) points directly and/or indirectly participates in data transmission to a UE in a time-frequency resource. Note that this set may or may not be transparent to UEs. The UEs can have direct participation such as point(s) actually transmitting data in the time-frequency resource, or indirect participation in which candidate point(s) for data transmission that do not transmit data but contribute in making decisions on the user scheduling/beamforming in the time-frequency resource.

The CoMP cooperating set also includes CoMP transmission point(s) that includes a point or a set of points transmitting data to a UE. The CoMP transmission point(s) can be a subset of the CoMP cooperating set. For JT, the CoMP transmission points can include multiple points in the CoMP cooperating set at each subframe for a certain frequency resource. For CS/CB, DPS, SSPS, a single point in the CoMP cooperating set includes the CoMP transmission point at each subframe for a certain frequency resource. For SSPS, the CoMP transmission points can change semi-statically within the CoMP cooperating set.

Another particular type of CoMP set includes a CoMP measurement set in which a set of points about which channel state/statistical information related to their link to the UE is measured and/or reported as discussed in section 5.2.2 of REF2. The UE reports can down-select points for which actual feedback information is transmitted. Nevertheless, the measurement of interference should be taken into consideration.

Another particular type of CoMP set includes a radio resource management (RRM) measurement set that comprises the set of cells for which the RRM measurements are performed. Additional CoMP resource management measurement methods can be considered, such as to separate different points belonging to the same logical cell entity or in order to select the CoMP measurement set. UE reports on the RRM measurement set are used by the network to determine the CoMP measurement set and the CoMP cooperating set. Certain embodiments of this disclosure provide methods for the network and the UE to manage the RRM measurement set.

Another particular type of CoMP set includes a CoMP Resource Management Measurement that comprises the set of CSI-RS resources for which CSI-RS based received signal measurements can be made and reported. These received signal measurements can be used to configure the CoMP Measurement Set. Other measurements, such as mobility measurements or SRS, can also be used to configure the CoMP Measurement Set. This is independent of existing mobility measurements and procedures.

In certain embodiments below, there are two types of RRM measurement sets; one type (Type 1) is based on cell-specific reference signal (CRS) measurement as in Rel-8/9/10 and another type (Type 2) is based on CoMP Resource Management Measurement.

In certain embodiments below, the signal quality measurement and report generated by the UE from measuring the CSI-RS as RSRP (Reference Signal Received Power)/RSRQ (Reference Signal Received Quality) (similar to the metrics defined in Technical Specification 36.214, version 10.1.0) shall be referred to. This is not restrictive and any other signal quality metrics can also be used.

In certain embodiments, the UE is configured to perform Type-1 RRM measurement (based on CRS) and Type-2 RRM measurement (based on CSI-RS) concurrently. Type-1 RRM measurement is used to manage inter-cell mobility in a manner similar to RRM measurements as described in Releases 8, 9, and 10 of the 3GPP Technical Specification; whereas Type-2 RRM measurement is used to manage CoMP cooperating set, CoMP measurement set and inter-TP mobility. The Type-2 RRM measurement set is typically referred to as a CoMP resource management measurement set.

In certain embodiments, when the UE is configured to perform Type-2 RRM measurements, the UE also performs Type-1 RRM measurements (similar to RRM measurement in Releases 8, 9, and 10 of the aforementioned specification) except that that the reference signals used are also CSI-RS, that is the UE is not required to measure the cell-specific reference signals. This embodiment, in some cases, can provide a common RRM measurement framework based on CSI-RS.

In certain embodiments, the network uses Type-2 RRM measurement for one or more purposes including, but not limited to CoMP measurement set management, slower CS/CB related measurements, and determination of CoMP measurement following handover.

With CoMP measurement set management, the network determines which TPs should be included in the CoMP measurement set (i.e., addition, removal, replacement). For slower CS/CB related measurements, such as slower CS/CB (e.g., semi-static point selection), it can be sufficient to have RRC reporting only for these TPs and thus not add these TPs to the CoMP measurement set. Therefore, a second purpose would be to have measurements on TPs not intended to be added to the CoMP measurement set, but only to know if they become strong interferers so that a slower CS/CB strategy needs to be adapted.

With the determination of CoMP measurement set after (inter-eNB/inter-cell) handover, measurements on some other TPs might not be directly relevant while the UE is in the current cell, but only when the UE is triggering (based on CRS measurements) an inter-cell/inter-eNB handover. Only then, in order to determine a new CoMP measurement set, the network might like to get measurements on these TPs so that immediately in the new cell a good CoMP measurement set can be used.

Figure 5:
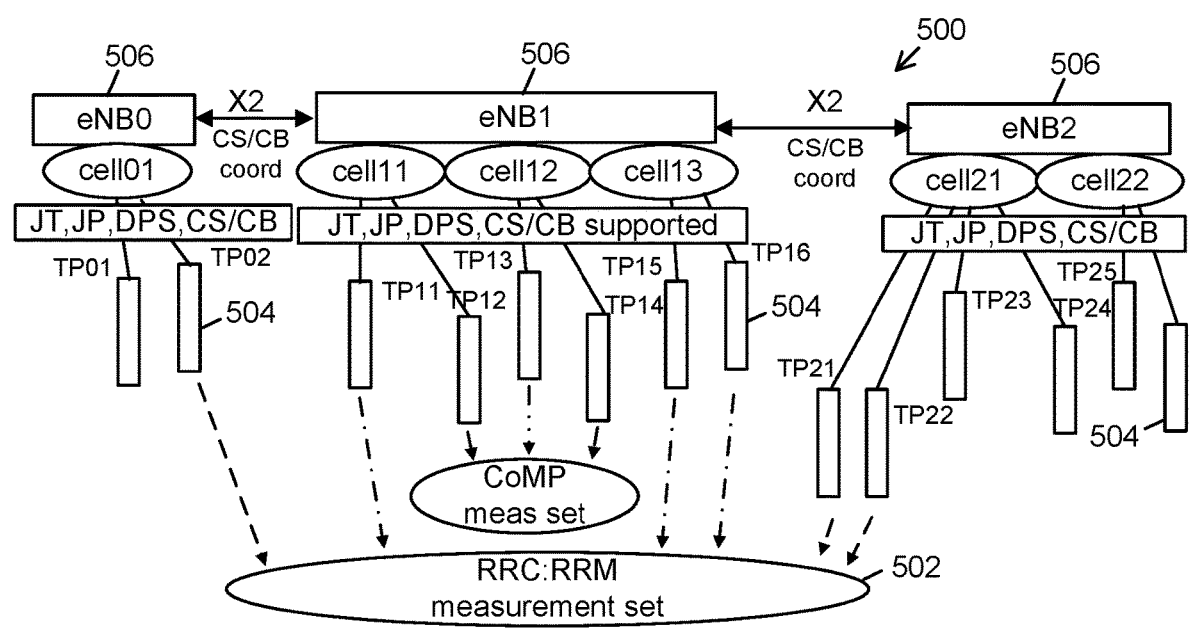
FIG. 5 illustrates an example network showing how a coordinated multipoint (CoMP) measurement set is generated from a Type-2 radio resource management (RRM) measurement set managed by a network of base stations according to embodiments of the present disclosure.

FIG. 5 illustrates an example network 500 showing how a Type-2 RRM measurement set 502 is generated from multiple transmission points (TPs) 504 managed by a network of base stations 506 according to embodiments of the present disclosure. The Type-2 RRM measurement set 502 shown in FIG. 5 is for illustration only. Other embodiments could be used without departing from the scope of this disclosure.

The Type-2 RRM measurement set includes a set of transmission points (TPs), which the UE considers to detect, measure, and report. The configuration is performed via dedicated signaling, i.e., the configuration is UE-specific. The set of TPs in the Type-2 RRM measurement set includes one or a combination of the following: (i) a set of TPs within a cell (i.e., corresponding to network 420 (See FIG. 4C) described above), (ii) a set of TPs across cells controlled by a single eNodeB, and/or a set of TPs across cells controlled by more than one eNodeBs.

Note that the figure is of illustrative nature only, as such the CoMP measurement set can include TPs from one cell only or can include TPs from multiple eNodeBs; likewise the RRM measurement set may not include TPs from multiple eNodeBs and so on.

A measurement object can be configured that specifies the TPs 504 that the UE should consider for the Type-2 RRM measurement set 502 for a given frequency. This is done either by extending the legacy measurement object measObjectEUTRA, or by defining a new measurement object for this purpose.

One or more elements of information about the TPs considered for the Type-2 RRM measurement set 502 are provided by the network, such as the carrier frequencies of the TPs, the physical cell id(s) (PCI) associated with the TP(s), e.g., are represented as a physical cell ID (PCI) range, a list of TPs, a TP-specific offset, and a cell-specific offset. The TPs can be represented/signaled by the CSI-RS configuration, the CSI-RS subframe configuration, and the number of CSI-RS ports, or are represented/signaled by TP indices, each of which is mapped to a combination of CSI-RS configuration, CSI-RS subframe configuration and number of CSI-RS ports. Alternatively, the TPs can be implicitly signaled by the Physical cell id(s) (PCI) associated with the TP(s), i.e., the list of TPs is derived from the PCIs signaled in (ii).

Additionally, information required for the UE to derive the CSI-RS sequence for each TP also can be signaled, e.g., the parameter X and/or Y in the following equation used to determine the CSI-RS sequence according to Equation 5:

$$c_{init}=2^{10} \cdot (7 \cdot (Y+1)+l+1) \cdot (2 \cdot X+1)+2 \cdot X+N_{CP} \quad \text{[Eqn. 5]}$$

In one alternative, the UE determines Y based on whether X corresponds to the PCI detected by the UE as one of the neighboring cells. If X corresponds to the PCI of a detected neighboring cell or corresponds to any PCI configured by PCIs associated with the TPs, the UE assumes Y is the slot number of the neighboring cell. The UE knows the slot number from primary synchronization signal (PSS)/secondary synchronization signal (SSS) detection of the neighboring cell. If X does not correspond to any PCI of the neighboring cells detected by the UE or any PCI configured by PCIs, the UE assumes the slot number is the same as that of the serving cell. Then Y needs not be signaled. In yet another alternative, Y is assumed to be the same as the number of TPs (ns) of the serving cell.

Additional information about the TPs considered for the Type-2 RRM measurement set 502 include a TP-specific offset. The TP-specific offset is used in a measurement reporting trigger as described below. If not specified for an applicable TP, a default TP-specific offset is set to 0 dB.

Additional information about the TPs considered for the Type-2 RRM measurement set 502 includes a cell-specific TP offset. The cell-specific TP offset generally includes a common offset for all TPs associated with the same cell. The cell-specific TP offset is used in a measurement reporting trigger as will be described in detail below.

The previously described information elements are exemplary. Other types of information can be used. For example, zero-power CSI-RS resources can be additionally configured (e.g., by higher-layer signaling such as RRC signaling) such that the RSRP measurement performed by the UE is relatively free from interference from the serving TP's DL data. Alternatively, the UE can assume that no PDSCH is mapped to the CSI-RS resources configured for RSRP measurement.

In one alternative, the list of TPs provided by the network includes a white list in which the UE is only required to try to detect, measure or report the TPs listed. The advantage of this alternative is that the UE is not required to detect, measure, or report TPs that are not listed, which could potentially include many TPs. This alternative can reduce the latency of TP detection which can be large especially for UE with low geometry.

In another alternative, the network provides a black list of TPs in which the UE is not required or not allowed to detect, measure, or report the black-listed TPs. The UE should, however, attempt to detect, measure, or report any other unlisted TPs.

In another alternative, the list of TPs provided by the network includes a priority list in which the UE is required to initially attempt to detect, measure, or report the TPs listed. The UE is allowed to detect, measure, or report any other unlisted TPs that it can find.

Optionally, a black list of TPs can also be provided so that the UE is not required or is not allowed to detect, measure, or report the black-listed TPs.

Some examples of how the network should configure the list of TPs to be considered by the UE are described below. One particular example includes, based on the knowledge of the network topology, such as the locations of TPs and the locations of UEs, the network determines that a UE, by its location, is within range of certain TPs. In this case, the network can include/exclude some of the TPs in the list. Another particular example includes a network that also uses information regarding the turning on and off of the TPs, for example, at night time in office areas, some of the TPs can be turned off, due to little or no traffic and for energy saving purposes. Hence, TPs such as these should not need to be included in the list. Likewise, if a TP is turned on in the day time in office areas, the TP can then be included in the list.

Another particular example includes a network that knows the load of each TP, which can be determined, for example, by each TP informing the network of its load. For example, the load can be the number of the UEs in its service, or the available air interface resources, such as time/frequency levels of the TP, and the like. The network can prioritize TPs with less load for some of the UEs to measure, report, or associate a transmission power, implement beamforming strategies, and the like. The obtained information can be used for the network to decide which TPs to be included in the list. For example, if a TP currently has a low transmission power due to interference coordination, but if such interference coordination is no longer needed such as because the UE that was in need of this interference coordination has moved out of the area, the transmission power of the TP can be set back. Then such TP can be in the list, due to its change of transmission power.

In addition, the following methods can be used to refine the TPs that the UE should consider for Type-2 RRM measurement:

In one method, the UE is not required to detect, measure, or report TP(s) of which the associated cell(s) has(have) not been detected by the UE using RRM measurement based on CRS (referred to as Type-1 in this disclosure), which can be the same as that defined in Releases 8, 9, and 10 of the 3GPP specification.

In another method, the UE is not required to detect, measure or report TP(s) of which the associated cell(s) has(have) not been reported by the UE with RRM measurement based on CRS (referred to as Type-1 in this document) which can be the same as that defined in Releases 8, 9, and 10 of the 3GPP specification.

The advantage of the methods described above is the reduction of the set of TPs that need to be considered by the UE. Based on the UE reports on the Type-2 RRM measurement set, the network can determine the CoMP measurement set and the CoMP cooperating set.

Figure 6:
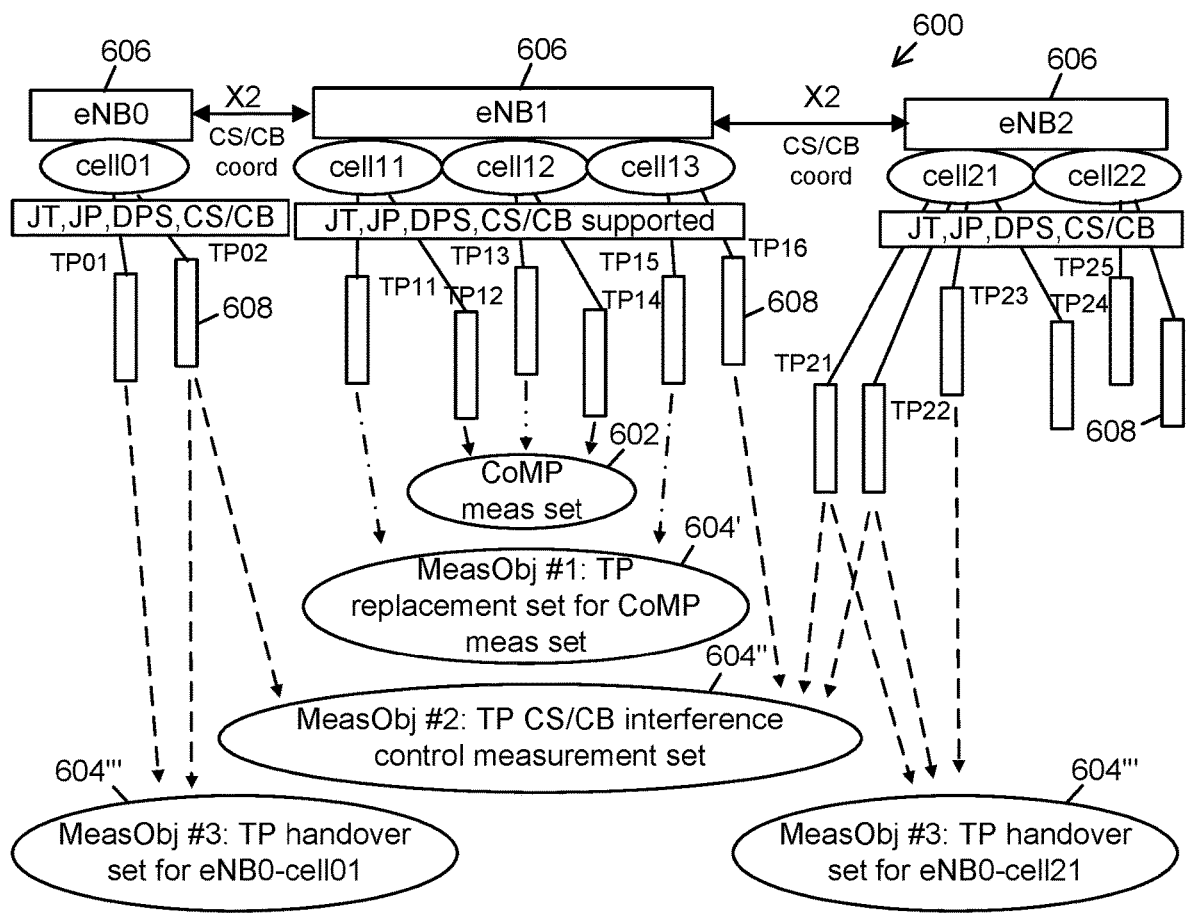
FIG. 6 illustrates another example network showing how a coordinated multipoint (CoMP) measurement set is generated from one or more Type-2 radio resource management (RRM) measurement sets managed by a network of base stations according to embodiments of the present disclosure.

FIG. 6 illustrates another example network 600 showing how a CoMP measurement set 602 is generated from one or more measurement objects 604 managed by a network of base stations 606 according to embodiments of the present disclosure. The measurement objects 604 shown in FIG. 6 are for illustration only. Other embodiments could be used without departing from the scope of this disclosure.

In certain embodiments, a Type-2 RRM measurement set configuration is generated by one or more measurement objects 604, whereby each measurement object 604 specify a different set of TPs and their associated parameters. In addition, each measurement object 604 also is linked with different report configuration(s). This allows the UE measurement and reporting behavior to be customized according to the purpose of the measurement applicable to the configured measurement object. The measurement objects may or may not contain overlapping set of TPs.

Since each measurement object is associated with a different set of TPs 608 and each measurement object is linked with a different report configuration, this embodiment provides TP-specific reporting event threshold/offset and hysteresis parameters to be configured with report configuration. This embodiment also allows the same TP to be configured with different TP-specific offsets in different measurement object.

In the particular example shown, different measurement objects are configured for different measurement purposes. The first measurement object 604' is used for the purpose of TP replacement for the CoMP measurement set, the second measurement object 604" is used as the CS/CB interference control measurement set, and the third measurement object 604'" is used to facilitate inter-cell handover.

In certain embodiments, the TP ID for CRM is defined as shown below. There is a need to define a unique ID for each CSI-RS resource/TP in the CRM set. Potential use cases of the ID are:
 1. Specific CSI-RS resource configuration release: the ID is used to indicate which CSI-RS resource is to be released by the UE.
 2. Reporting: ID is included in the CSI-RSRP measurement report to indicate which CSI-RS resource is reported.
 3. In some cases, ID also is used to indicate which CSI-RS resource is to be added by the UE for CRM measurement.

Alternatives for the definition of TP ID include the methods described below.

In one method, the CSI-RS resource/TP ID is explicitly configured by the network.
 The TP ID is provided by higher layer signaling, e.g., RRC signaling.
 The maximum range of ids is the same as the max size of CRM set (which can be fixed/predefined, or configurable by the network).

In another method, the ID for a CSI-RS resource is implicitly determined from the CSI-RS configuration parameters for the CSI-RS resource.

An advantage of this method is that explicit signaling of TP ID is not required. If blind detection of TPs/CSI-RS resources is supported, this method facilitates reporting of TPs not configured by the network.

In one sub-method (sub-method A), the ID is equivalent to the Scrambling initialization parameter configured for the CSI-RS resource. In one example, the scrambling initialization parameter is the virtual cell ID that replaces physical cell ID in the CSI-RS scrambling initialization (0-503; total of 9 bits).

In another sub-method (sub-method B), the ID is a function of ResourceConfig, and SubframeConfig.

As an example, TP ID=25, and SubframeConfig+ResourceConfig yielding a total of 13 bits. As another example, TP ID={max_size_of_ResourceConfig}, SubframeConfig+ResourceConfig, which in example, is equivalent to 32), and SubframeConfig+ResourceConfig to yield a total of 13 bits. As another example, TP ID=28, and ResourceConfig+SubframeConfig to yield a total of 13 bits. As another example, TP ID={max_size_of_SubframeConfig}, ResourceConfig+SubframeConfig, which in one example, is equivalent to 155, ResourceConfig+SubframeConfig for a total of 13 bits. Note that ResourceConfig has a maximum of 32 possible configurations and SubframeConfig has a maximum of 155 possible configurations according to Table 6.10.5.2-1 and Table 6.10.5.3-1 of TS 36.211 V10.4.0.

In the above examples, the TP ID is defined independent of the number of CSI-RS antenna ports (AntennaPortsCount). In one variation of this sub-method, the TP ID definition is different for different number of CSI-RS antenna ports, e.g., the Ex1 and Ex2 are for 1 or 2 CSI-RS antenna ports.

For 4 CSI-RS antenna ports, the TP ID is, for example, TP ID=24 and SubframeConfig+ResourceConfig to yield a total of 12 bits, where ResourceConfig has 16 possible configurations (4 bits), according to Table 6.10.5.2-1 of TS 36.211 V10.4.0 for 4 CSI-RS antenna ports, and the range for SubframeConfig is 0-154 (according to Table 6.10.5.3-1 of TS 36.211 V10.4.0).

For 8 CSI-RS antenna ports, the TP ID is, for example, TP ID=23 and SubframeConfig+ResourceConfig to yield a total of 12 bits, where ResourceConfig has 8 possible configurations (3 bits), according to Table 6.10.5.2-1 of TS 36.211 V10.4.0 for 8 CSI-RS antenna ports, and the range for SubframeConfig is 0-154 (according to Table 6.10.5.3-1 of TS 36.211 V10.4.0). If blind detection of TPs and their associated CSI-RS resources is supported by the UE, higher layer signaling (e.g., by RRC signaling) to inform the UE of the number of CSI-RS antenna ports can be provided by the network when explicit configuration of CSI-RS resources are not available.

In another sub-method (i.e., sub-method C), the ID is a function of ResourceConfig, SubframeConfig, and AntennaPortsCount. In one example, TP ID=$2^7$ and SubframeConfig+$2^2$·ResourceConfig+AntennaPortsCount to yield a total of 15 bits. In another example, TP ID=$2^{10}$ and ResourceConfig+$2^2$·SubframeConfig+AntennaPortsCount to yield a total of 15 bits.

In another sub-method (sub-method D), the ID is a function of ResourceConfig, SubframeConfig and Scrambling initialization parameter. In one example, TP ID=$2^{14}$ and SubframeConfig+$2^9$·ResourceConfig+Scrambling initialization parameter to yield a total of 22 bits. In another example, TP ID=$2^{17}$ and ResourceConfig+$2^9$·SubframeConfig+Scrambling initialization parameter to yield a total of 22 bits. In yet another example, the effective TP ID is represented by a pair of parameter values, e.g., the first parameter is the TP ID as derived from sub-method B, and the second parameter is the scrambling initialization parameter.

In another sub-method (sub-method E), the ID is a function of ResourceConfig, SubframeConfig and Scrambling initialization parameter and AntennaPortsCount. In one example, TP ID=$2^{16}$, SubframeConfig+$2^{11}$·ResourceConfig+$2^2$, and Scrambling initialization parameter+AntennaPortsCount yield a total of 24 bits. In another example, TP ID=$2^{19}$, ResourceConfig+$2^{11}$, SubframeConfig+$2^2$·Scrambling initialization parameter+AntennaPortsCount yield a total of 24 bits. In yet another example, the effective TP ID is represented by a pair of parameter values, e.g., the first parameter is the TP ID as derived from sub-method C, and the second parameter is the scrambling initialization parameter. Note that other obvious variations of the above examples are possible, e.g., switching of the order of the parameters in the equations.

Upon configuration of CRM measurement, the UE measures CSI-RS resources and if the reporting criterion configured is passed, the identities of the CSI-RS resources/TPs used for reporting is determined using the methods above. When releasing a TP from the CRM set, the network can signal the TP ID to be removed and the UE can derive the CSI-RS resources to be removed from the CRM set using the methods above.

In order to enable the UE to keep track of the TPs that triggered a particular event and report, the TPs that triggered a particular event or report are stored by the UE in a list that can be referr3ed to as TPsTriggeredList. A report is triggered when a new TP meets the event entering condition or the leaving condition All TPs that passed the entering condition of an event are stored by the UE in TPsTriggeredList until they pass the leaving condition. When a report is triggered, all TPs in the TPsTriggeredList up to a maximum number of TPs, where the maximum number of TPs are either predefined or configurable by the network, are reported. The measurement result for each TP includes its TP ID and its CSI-RSRP.

In Releases 8, 9, and 10 of RRM measurement, L3 filtering is applied to L1 measurement results according to Equation 6:

$$F_n = (1-a) \cdot F_{n-1} + a \cdot M_n \qquad [\text{Eqn. 6}]$$

where $M_n$ is the latest received measurement result from the physical layer. $F_n$ is the updated filtered measurement result, that is used for evaluation of reporting criteria or for measurement reporting. $F_{n-1}$ is the old filtered measurement result, where $F_0$ is set to $M_1$ when the first measurement result from the physical layer is received.

$$a = \frac{1}{2}(k/4),$$

where k is the filterCoefficent for the corresponding measurement quantity received by the quantityConfig.

For CRM measurement: in one option, L3 filtering is disabled (k is always 0) or removed for CRM measurement. In another option, L3 filtering is still applicable for CRM and the procedure applied for RRM is reused as shown in the following alternatives:

Alternative 1: No L3 filtering for CRM.
This saves implementation and testing effort.
This is realized by specifying k is fixed to 0 for CRM.
Alternative 2: L3 filtering is applicable for CRM.
This is beneficial to avoid measurement spike.

Sampling rate for L3 filtering (e.g., 400 ms, 800 ms, etc) is different from the sampling rate for RRM L3 filtering.

RRC configured L3 filtering parameters (filterCoefficient) for CRM is different from that for RRM (i.e., independent configuration), including the default value (e.g., the default filterCoefficient for RRM is k=4, while the default filterCofficient for CRM is k=0).

It is assumed CSI-RSRP is only applicable for RRC_CONNECTED intra-frequency. If CoMP is configured in conjunction with carrier aggregation, CoMP also operates on an SCell. In certain embodiments, the following methods for UE behaviors for CRM measurement on the SCell are used:

In a first method, if CRM for an SCell is configured, CRM measurement as well as reporting can only be performed when the SCell is activated.

This method allows maximum power saving for the UE as the UE is not required to measure CSI-RS when the SCell is deactivated.

The CRM configuration may not be released when the SCell is deactivated. This means that RRC reconfiguration for the CRM is not needed upon reactivation of the SCell.

In a second method, if CRM for an SCell is configured, CRM measurement can also be performed when the SCell is deactivated. No CRM reporting is performed.

This method requires the CSI-RS measurement to be performed by the UE even when the SCell is deactivated, which improves the accuracy of the measurement when reporting resumes after the SCell is reactivated.

Reporting is not required since CoMP does not operate during deactivated state of the SCell and the report may not be accurate.

This method also has the benefit that performance requirement and measurement cycle for the SCell for CRM measurement purpose may not be defined since reporting during deactivated state is not needed.

In a third method, if CRM for an SCell is configured, CRM measurement as well as reporting can also be performed when the SCell is deactivated.

This method allows fast configuration/reconfiguration of CoMP measurement set by the network after the SCell is reactivated based on the measurement report obtained during the deactivated state of the SCell.

In a fourth method, the first, second, and third previously described methods, or subsets thereof are configured by the network via higher layer signaling, e.g., RRC signaling. This enables maximum flexibility for the network.

The CRM measurement/reporting configuration for an SCell is autonomously released by the UE when the SCell is removed/de-configured. In another alternative, the CRM measurement/reporting is only suspended when the SCell is removed/de-configured, that is, the CRM measurement/reporting configuration for the SCell is still kept by the UE.

Figure 7:
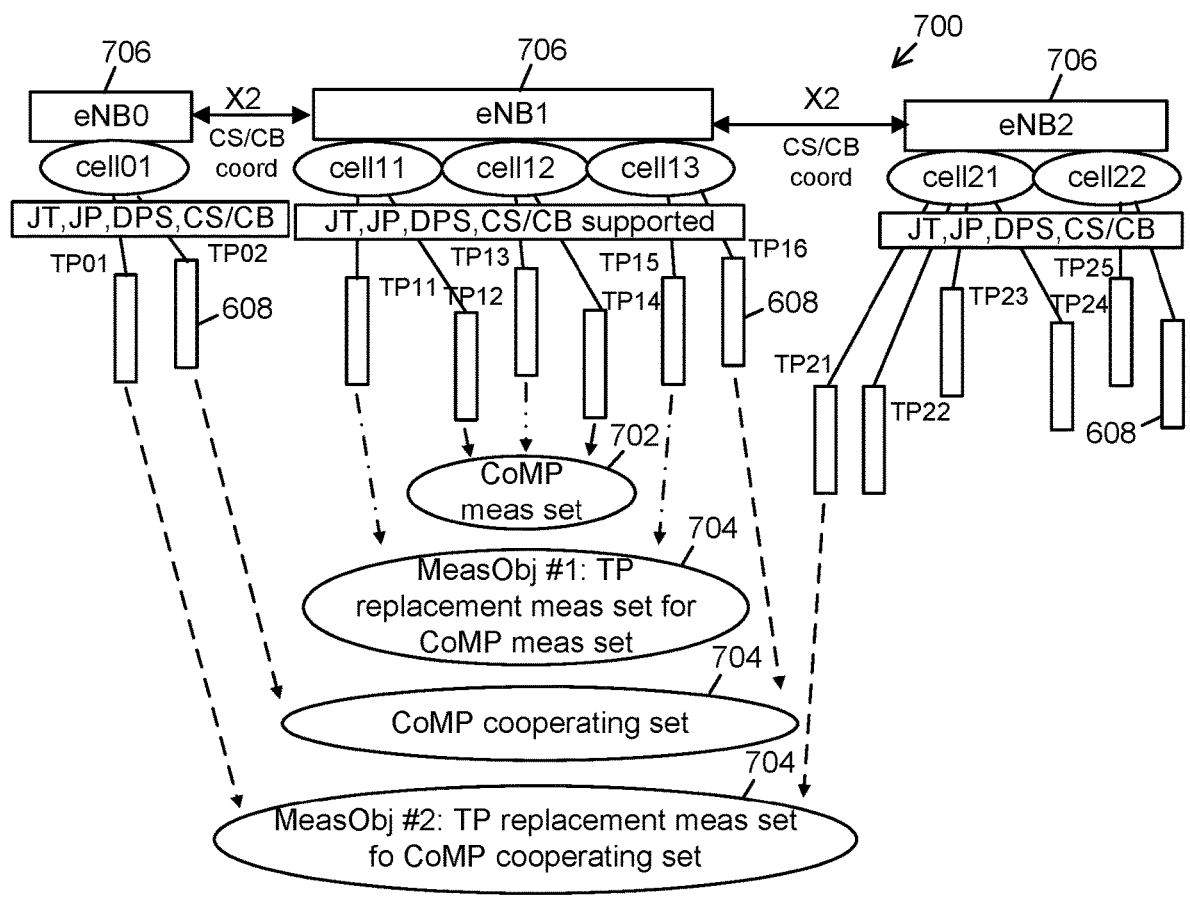
FIG. 7 illustrates another network showing how a CoMP measurement set and a CoMP cooperating set are generated from one or more Type-2 radio resource management (RRM) measurement sets managed by multiple base stations according to embodiments of the present disclosure.

FIG. 7 illustrates another network 700 showing how a CoMP measurement set 702 is generated from one or more measurement objects 704 managed by multiple base stations 706 according to embodiments of the present disclosure. The measurement objects 704 shown in FIG. 7 are for illustration only. Other embodiments could be used without departing from the scope of this disclosure.

In one embodiment, the signal quality measurement is based on CSI-RS measurement (e.g., RSRP) is based on one or more alternatives. In one alternative, for signal quality determination for a TP based on the CSI-RS, the CSI-RS port 15 is used. In another alternative, for signal quality determination for a TP based on the CSI-RS, the CSI-RS port 15 is used. If the UE can reliably detect that port 16 is available, the UE uses port 16 in addition to port 15 to determine the signal quality. In another alternative, for signal quality determination for a TP based on the CSI-RS, all available CSI-RS ports (associated with the TP) are used. Accordingly, an advantage of more accurate RSRP results are produced in case the CSI-RS density for a TP is low.

In one embodiment, the network configures criteria for measurement report triggering for Type-2 RRM measurements. The UE reports measurement results for one or more applicable TPs when an event is triggered, that is, conditions for reporting are fulfilled. One or more events can be used. A first event includes where the TP increases to have an offset better than a reference TP. In this manner, the UE reports if the signal quality of a TP has an offset within that of a reference TP, such as a UE entering a cell, or has become an offset worse than that of a reference TP, such as a UE leaving a cell. If the reference TP is configured by the network, this event also can be used to report if the signal quality of a TP has some offset better than that of a reference TP (e.g., for detecting the strongest TP).

The reference TP is determined according to one or more alternatives. In a first alternative, the strongest TP (TP with the highest RSRP value, measured based on the CSI-RS) is determined by the UE. The strongest TP is subject to the event when a TP increases above reference TP, the strongest TP also triggers the event by itself. Optionally, restriction is imposed by the network on which TP is considered as the strongest TP by the UE, e.g., the TP belongs to an indicated list of TPs/cells, or the TP belongs to a cell. This allows TPs that are not suitable, e.g., TPs that cannot participate in CoMP, to be precluded from consideration as the strongest TP. This restriction does not need to apply to TPs considered for comparison with the strongest TP under this event (e.g., to help with TP selections for inter-eNB/inter-cell handover, or less advanced inter-eNB/inter-cell coordination). Optionally, if an event in which there is a change in the strongest y TPs to track the strongest TP is also defined, the strongest TP can only be changed after the report for the event is triggered and sent.

In a second alternative, a specific TP is configured by the RRC. This gives the network full control on which TP is to be considered as the reference TP. The network decides to (re)configure the reference TP based on UE reports for an event where the signal quality of a TP is reported to be some margin better than the reference TP, the reference TP can be changed by the network. Upon change with the reference TP, all TPs considered for RRM measurement shall be reevaluated for their reporting conditions.

One option for the entering condition and the leaving condition can be determined according to Equations 7 and 8 respectively:

$$Mcp-Hys>Mrp+Off \quad [\text{Eqn. 7}]$$

$$Mcp+Hys<Mrp+Off \quad [\text{Eqn. 8}]$$

when Mcp is the measurement result of the TP concerned, not taking into account any offsets. Mrp is the measurement result of the reference TP, not taking into account any offsets. Hys is the hysteresis parameter for this event. Off is the offset parameter for this event (e.g., Off is a real number ranging from −x1 dB to +x2 dB, or Off is a real negative value ranging from −x1 dB to −x2 dB which is more useful if the reference TP is defined as the strongest TP). Mcp and Mrp are expressed in dBm in case of RSRP, or in dB in case of RSRQ. Additionally, Hys and Off are expressed in dB.

In another option, TP offsets and/or cell-specific offset are also included to allow TP-specific fine-tuning and the entering condition and the leaving condition are shown in Equations 9 and 10 respectively:

$$Mcp+Opcp-Hys>Mrp+Oprp+Off \quad \text{[Eqn. 9]}$$

$$Mcp+Opcp+Hys<Mrp+Oprp+Off \quad \text{[Eqn. 10]}$$

when Mcp is the measurement result of the TP concerned, not taking into account any offsets. Opcp is the TP specific offset or cell-specific offset or (TP-specific offset+cell-specific offset) of the TP concerned. Mrp is the measurement result of the reference TP, not taking into account any offsets. Oprp is the TP specific offset or cell-specific offset or (TP-specific offset+cell-specific offset) of the reference TP. Hys is the hysteresis parameter for this event. Off is the offset parameter for this event (e.g., it can be a real number ranging from −x1 dB to +x2 dB, or it can be a real negative value ranging from −x1 dB to −x2 dB) which is more useful if the reference TP is defined as the strongest TP). Mcp are Mrp are expressed in dBm in case of RSRP, or in dB in case of RSRQ. Opcp, Oprp, Hys, and Off are expressed in dB.

If the reference TP is the strongest TP, as previously mentioned, the reference TP can also trigger an event where the signal quality of a TP is reported to be some margin better than the reference TP. In this case, the condition: −Hys>Off has to be satisfied (i.e., ensured by the network configuration) so that the strongest TP is ensured to be reported. Note that Off can take only negative values, if the reference TP is the strongest TP.

Upon triggering of the event, the UE sends a measurement report, which can include initiating a measurement report procedure. The measurement report includes the identity(ies) of the TP(s) that triggered the event and its (their) corresponding measurement result(s), e.g., RSRPs, and the identity of the reference TPs and the corresponding measurement result, e.g., RSRPs. The identity of the reference TPs may not be needed, for example if the reference TP is RRC configured.

Figure 8:
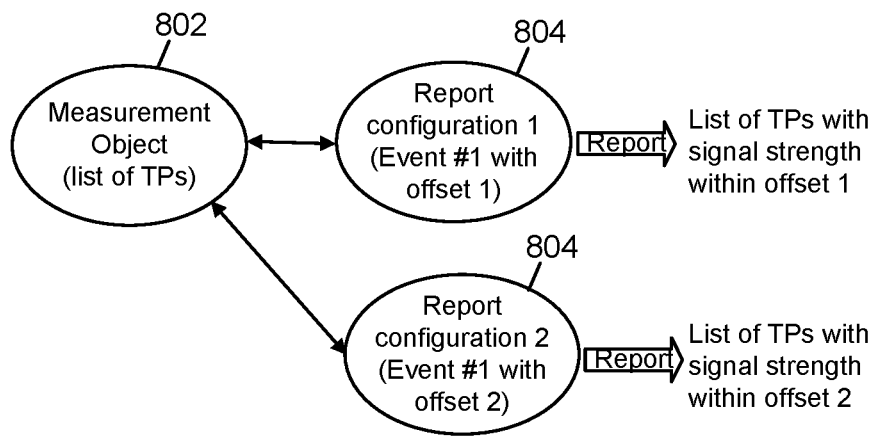
FIG. 8 illustrates an example measurement object showing how multiple events with different offset values can be configured according to embodiments of the present disclosure.

FIG. 8 illustrates an example measurement object 802 showing how multiple events 804 with different offset values are configured according to embodiments of the present disclosure. The measurement objects 802 shown in FIG. 8 are for illustration only. Other embodiments could be used without departing from the scope of this disclosure.

In the particular example shown, measurement object 802 generates two separate events 804 in which a first event is generated according to a first offset and a second event is generated according to a second offset that is different from the first offset. In this manner, TPs are sorted by the UE according to different signal quality levels.

The UE is configured to perform measurement and reporting to assist E-UTRAN with the management of CoMP measurement set. In particular, the UE is configured to measure and report CSI-RSRP measurements on a set of CSI-RS resources, also referred to as the CoMP Resource Management (CRM) Set. The measurement and reporting on the CoMP Resource Management Set are generally independent of existing mobility measurement and reporting procedures. In some embodiments, the E-UTRAN also takes other measurements, such as mobility measurements or SRS, into consideration when managing the CoMP measurement set.

With respect to CSI-RS resource configuration for CRM set: (i) the UE is only required to measure and report on CSI-RS resources that are explicitly configured by E-UTRAN, i.e., the UE is not required to autonomously detect CSI-RS resources, (ii) the CSI-RS resources in the CRM set are configured independently from those in the CoMP measurement set, and (iii) the CRM set is configured as part of a measurement object.

With respect to measurement reporting on CRM set: (i) the UE provides CSI-RSRP measurement results, (ii) at least periodic and/or event triggered reporting are supported, and (iii) event triggers can either be absolute (i.e., comparing measurement result to a threshold) or relative (i.e., comparing measurement result to that of another CSI-RS resource, for example the best CSI-RS resource in the CRM set). In general, it is assumed that a CSI-RSsTriggeredList, which is analogous to cellsTriggeredList exists. Also, a report is triggered when a new CSI-RS resource meets the event entering condition. All CSI-RS resources that passed the entering condition of an event are stored by the UE in CSI-RSsTriggeredList until they pass the leaving condition. The report contains all CSI-RSs in the CSI-RSsTriggeredList up to a configured maximum number of CSI-RS resources.

Report triggering includes an Event C1 (i.e., CSI-RS resource becomes better than threshold) and an Event C2 (i.e., CSI-RS resource becomes better than the best CSI-RS resource in the CRM minus offset). Other report triggering events can include, but not limited to, Event C3 (i.e., CSI-RS resource becomes offset better than a configured reference CSI-RS resource), Event C4 (i.e., CSI-RS resource becomes worse than threshold), Event C5 (i.e., best N CSI-RS resources are changed, N is a preconfigured number), Event C5a (i.e., best N CSI-RS resources which are better than a threshold are changed, N is a preconfigured number), Event C6 (i.e., The measurement result of a candidate CSI-RS resource becomes offset better than that of the worst reference CSI-RS resource), and Event C7 (i.e., A CSI-RS resource becomes better than any one of the CSI-RS resources in the reference set).

The entering condition and leaving conditions for Event C1 can operate according to Equations 11 and 12 respectively:

$$Mcp+Opcp-Hys>\text{Thresh} \quad \text{[Eqn. 11]}$$

$$Mcp+Opcp+Hys<\text{Thresh} \quad \text{[Eqn. 12]}$$

where Mcp is the measurement result of the target CSI-RS resource (dBm for CSI-RSRP), Hys is the hysteresis parameter for this event (dB), Thresh is the offset parameter for this event (dB), and Opcp is the offset of the target CSI-RS resource.

The entering condition and leaving conditions for Event C2 can operate according to Equations 13 and 14 respectively:

$$Mcp+Opcp-Hys>Mrp+Oprp-Off \quad \text{[Eqn. 13]}$$

$$Mcp+Opcp+Hys<Mrp+Oprp-Off \quad \text{[Eqn. 14]}$$

where Mcp is the measurement result of the target CSI-RS resource (dBm for CSI-RSRP), Mrp is the measurement result of the strongest CSI-RS resource (dBm for CSI-RSRP), Hys is the hysteresis parameter for this event (dB), Off is the offset parameter for this event (dB) (which takes positive values), Opcp is the offset of the target CSI-RS resource, and Oprp is the offset of the strongest CSI-RS resource.

The best resource is the CSI-RS resource that gives the highest CSI-RSRP value and is determined by the UE at the time of evaluation; the UE keeps track of the best resource.

Event C2 is triggered when a new CSI-RS resource that is not in the current CSI-RS resource triggered list becomes the best resource at the time of evaluation (including the case of an empty list, i.e., after first configuration). This is because the best resource as also a candidate resource to be evaluated. In this case, the entering condition reduces to: Hys<Off since Mcp=Mrp and Opcp=Oprp. Therefore, as long as Hys is set smaller than Off, the new best CSI-RS resource will trigger the event and gets reported.

In certain embodiments, all the CSI-RS resources that trigger the Event C2 for a UE are below the minimum signal strength threshold deemed necessary or desirable by the network to operate a CoMP scheme on the UE. This scenario occurs when the UE is at the edge of several coordinating transmission points (TPs)/cells and the signal strengths from all TPs are weak. Since the corresponding measurement report cannot be used by the network to setup CoMP measurement set, the report can be seen as unnecessary.

In order to avoid unnecessary measurement report, a minimum threshold for the signal strength of the best CSI-RS resources within the CoMP resource measurement set is preconfigured so that the UE is only required to report measurement results if the best CSI-RS resource within the CoMP resource measurement set satisfies the preconfigured threshold. The threshold can be configured by higher layer signaling (e.g., by radio resource control (RRC) signaling) by the network.

In another example, a minimum threshold for the signal strength of the second best CSI-RS resources within the CoMP resource measurement set can be preconfigured so that the UE is only required to report measurement results if the second best CSI-RS resource within the CoMP resource measurement set satisfies the preconfigured threshold. The threshold is configured by higher layer signaling (e.g., RRC signaling) by the network.

In another example, a minimum threshold for the signal strength of the x-th best CSI-RS resources within the CoMP resource measurement set is preconfigured so that the UE is only required to report measurement results if the x-th best CSI-RS resource within the CoMP resource measurement set satisfies the preconfigured threshold. The threshold is configured by higher layer signaling (e.g., RRC signaling) by the network. In addition, x is configured by higher layer signaling (e.g., RRC signaling) by the network or fixed/predetermined in the specification.

In another example, a minimum threshold for the signal strength of CSI-RS resources within the CoMP resource measurement set is preconfigured so that the UE is only required to report measurement results if any CSI-RS resource within the CoMP resource measurement set satisfies the preconfigured threshold. The threshold is configured by higher layer signaling (e.g., RRC signaling) by the network.

In another example, a minimum threshold for the signal strength of CSI-RS resources within the CoMP resource measurement set is preconfigured so that the UE is only required to report measurement results if at least two CSI-RS resources within the CoMP resource measurement set satisfy the preconfigured threshold. The threshold is configured by higher layer signaling (e.g., RRC signaling) by the network.

In another example, a minimum threshold for the signal strength of CSI-RS resources within the CoMP resource measurement set is preconfigured so that the UE is only required to report measurement results if at least x CSI-RS resources within the CoMP resource measurement set satisfy the preconfigured threshold. The threshold is configured by higher layer signaling (e.g., RRC signaling) by the network. In addition, x is configured by higher layer signaling (e.g., RRC signaling) by the network or fixed/predetermined in the specification.

In certain embodiments, only one CSI-RS resource is in the CSI-RSsTriggeredList corresponding to Event C2. However, reporting of CSI-RSRP for CSI-RSsTriggeredList including only one CSI-RS resource is not beneficial for CoMP since more than one CSI-RS resource is needed for the network to operate a CoMP scheme, e.g., the DPS.

In one method, in order to avoid unnecessary measurement reports, if there is only one CSI-RS resource in the CSI-RSsTriggeredList, the UE is not required to report the measurement result. For example, the CSI-RSsTriggeredList is initially empty and after the entering condition of Event C2 for only one CSI-RS resource is satisfied, the UE includes the CSI-RS resource in the CSI-RSsTriggeredList but does not send the measurement report. In another example, the CSI-RSsTriggeredList initially includes only one CSI-RS resource. If there is a change in the best CSI-RS resource (e.g., event C2 is triggered) in which the new best resource enters the CSI-RSsTriggeredList and the previous best CSI-RS resource leaves the CSI-RSsTriggeredList, The UE updates the CSI-RSsTriggeredList but does not send the measurement report as there is still only one CSI-RS resource in the CSI-RSsTriggeredList.

Another method is the same as the previous method except that the CSI-RSsTriggeredList of only one CSI-RS resource is still reported by the UE if there were two or more CSI-RS resources in the CSI-RSsTriggeredList for the previous measurement report. The advantage of this example is that the network would be able to detect that the CoMP might need to be disabled for the UE as there is only one CSI-RS resource in the CSI-RSsTriggeredList.

The same method to reduce unnecessary measurement reports is also is applied to other events, such as Event C1 and C3. In other embodiments, both methods described above are applied to Event C2.

Figure 9:
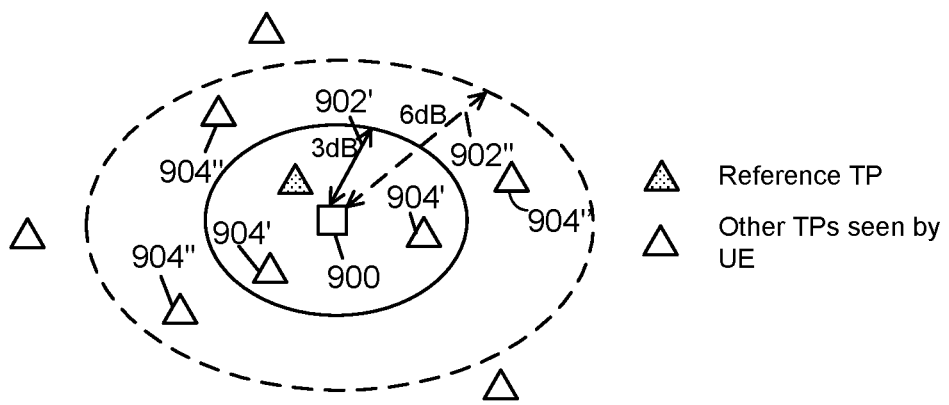
FIG. 9 illustrates an example reception range of a user equipment (UE) according to embodiments of the present disclosure.

FIG. 9 illustrates an example transmission range of a UE 900 according to embodiments of the present disclosure. The measurement range of the UE 900 shown in FIG. 9 is for illustration only. Other embodiments could be used without departing from the scope of this disclosure.

As shown, the UE 900 includes a first range 902' indicating a space in which various TPs 904' can be detected, and a second larger range 902" from which TPs 904' and TPs 904" can be detected. The first range 902' represents an offset, which in this example is 3 dB. The second range 902" represents an offset, which in this example is 6 dB. The offset associated with the first range 902' is used to assist with CoMP measurement set management, while the offset associated with the second range 902" is used to assist with CoMP cooperating set management.

One particular event refers to one in which the TP becomes better than a threshold. One option for the entering condition and the leaving condition can be defined by Equations 15 and 16 respectively:

$$Mcp-Hys>\text{Thresh} \qquad [\text{Eqn. 15}]$$

$$Mcp+Hys<\text{Thresh} \qquad [\text{Eqn. 16}]$$

where Mcp is the measurement result of the TP concerned, not taking into account any offsets. Hys is the hysteresis parameter for this event. Thresh is the threshold parameter for this event. Mcp is expressed in dBm in case of RSRP, or in dB in case of RSRQ. Hys are expressed in dB.

In another option, TP offsets and/or cell-specific offset are also included to allow TP-specific fine-tuning, and the entering condition and the leaving condition is defined as shown by Equations 17 and 18 respectively:

$$Mcp+Opcp-Hys>Thresh \quad [\text{Eqn. 17}]$$

$$Mcp+Opcp+Hys<Thresh \quad [\text{Eqn. 18}]$$

where Mcp is the measurement result of the TP concerned, not taking into account any offsets. Opcp is the TP specific offset or cell-specific offset or (TP-specific offset+cell-specific offset) of the TP concerned. Hys is the hysteresis parameter for this event. Thresh is the threshold parameter for this event. Mcp is expressed in dBm in case of RSRP, or in dB in case of RSRQ. Opcp, Hys are expressed in dB.

Multiple report configurations for the same event with different parameter values, such as the threshold are linked with the same measurement object. This, in some cases, enables the network to keep track of the set of TPs with a certain range of signal quality (RSRP/RSRQ) for each UE. Based on this information, the network configures the CoMP measurement set, or the TPs that should be involved in certain CoMP schemes (e.g., JP or CS/CB) accordingly.

Upon triggering of the event, the UE sends a measurement report. The measurement report includes the identity(ies) of the TP(s) that triggered the event and its(their) corresponding measurement result(s), e.g., RSRPs.

Another event refers to a condition in which there is a change in the strongest y TPs. The strongest TPs are TPs with the highest RSRP values. In one example, y is a fixed value, for example 1, 2, or the same as the CoMP measurement set size. In another example, y is configurable by the network.

Using the alternative in which the strongest TP is determined by the UE, for a condition in which y>1, the change in the ranking of the RSRP values of the strongest y TPs also triggers the report; this allows the network to keep track of the signal qualities of the strongest y TPs. To reduce the amount of unnecessary triggering it can cause. For example, if the best three TPs are included in the CoMP measurement set, the network may not care about changing in order among the three TPs to be reported by the RRC. Optimizations that limit reporting are one or more of the following: (i) only report a change of order if after "order swap" the better TP is more than xdB (x configurable e.g., 3 dB) better than the lower TP, (ii) do not report a change if it only concerns 2 TPs already part of the CoMP measurement set, and/or (iii) quality swap of 2 TPs which both have a quality below the quality of the lowest quality TP in the CoMP measurement set is not reported.

Using the alternative in which the signal quality determination for a TP is based on the CSI-RS, for the condition in which y>1, the change in the ranking of the RSRP values of the strongest y TPs alone does not trigger the report; this is beneficial for reducing the frequency of reporting.

Using the alternative in which all available CSI-RS ports associated with the TP are used, for the condition in which y>1, whether the two previous alternatives described above are configurable by the network, this event is useful for the network to manage the CoMP measurement set. Further, this event allows the network to always be aware of the best y TPs to be configured as the CoMP measurement set. If the network wants to know the strongest TP, y=1 event can be configured. If the network wants to identify the strongest 2 TPs to participate in a CoMP JT scheme, (additional) an event in which there is a change in the strongest y TPs is configured with y=2. To evaluate if a TP should be included in the strongest y TPs, one option for the entering condition and the leaving condition are defined as shown in Equations 19 and 20:

$$Mcp-Hys>Mrp+Off \quad [\text{Eqn. 19}]$$

$$Mcp+Hys<Mrp+Off \quad [\text{Eqn. 20}]$$

where Mcp is the measurement result of the TP concerned, not taking into account any offsets. Mrp is the measurement result of the weakest of the y TPs, not taking into account any offsets. Hys is the hysteresis parameter for this event. Off is the offset parameter for this event. Mcp and Mrp are expressed in dBm in case of RSRP, or in dB in case of RSRQ. Hys and Off are expressed in dB.

To evaluate if a TP should be included in the strongest y TPs, in another option, TP offsets are also included to allow TP-specific fine-tuning, and the entering condition and the leaving condition are defined as shown in Equations 21 and 22 respectively:

$$Mcp+Opcp-Hys>Mrp+Oprp+Off \quad [\text{Eqn. 21}]$$

$$Mcp+Opcp+Hys<Mrp+Oprp+Off \quad [\text{Eqn. 22}]$$

where Mcp is the measurement result of the TP concerned, not taking into account any offsets. Opcp is the TP specific offset or cell-specific offset or (TP-specific offset+cell-specific offset) of the TP concerned. Mrp is the measurement result of the weakest of the y TPs, not taking into account any offsets. Oprp is the TP specific offset or cell-specific offset or (TP-specific offset+cell-specific offset) of the reference TP. Hys is the hysteresis parameter for this event. Off is the offset parameter for this event. Mcp and Mrp are expressed in dBm in case of RSRP, or in dB in case of RSRQ. Opcp, Oprp, Hys, and Off are expressed in dB.

To evaluate if the ranking among the y TPs has changed, the entering and leaving conditions defined previously are used where Mcp is associated with the TP that has a lower rank previously and Mrp is associated with the TP that has a higher rank previously.

Upon triggering of the event, the UE sends a measurement report (initiate measurement report procedure). The measurement report includes the identity(ies) of the strongest y TP(s) that and its(their) corresponding measurement result(s), e.g., RSRPs, and the identity(ies) of the strongest z≤y TP(s) that and its(their) corresponding measurement result(s), e.g., RSRPs, where z can be configurable by the network (e.g., RRC).

For all events described above, multiple reporting configurations of the same event with different parameter values are configured by the network. For all events described above, the UE sends a measurement report when the entering condition is fulfilled. For all events described above, the UE sends a measurement report when the leaving condition is fulfilled. Alternatively, sending the measurement report when the leaving condition is fulfilled is configurable: 'report on leave' is configured to inform the network when a TP fulfils the specified leaving condition. Optionally, upon fulfilling the entering condition of an event, the UE is configured to perform periodic measurement reporting of the TP(s) that triggered the event and other relevant report content for the event.

The TP identity in the measurement report is either represented by the CSI-RS configuration index and the CSI-RS subframe configuration index, or by a TP index which maps to a CSI-RS configuration and CSI-RS subframe configuration. Additionally, while each event above has been described with an entering condition and a leaving condition, it is also possible to define the entering and the leaving as separate events. Regardless, the achieved functionality is similar.

In one embodiment, the network and the UE keep track of a specified quantity of TPs for RRM measurement purposes. This quantity of TPs can be used as the CoMP cooperating set by the network. The network selects a subset of these TPs as the CoMP measurement set. This quantity of TPs is denoted as the Set x and it is typically a subset of the Type-2 RRM measurement set. The advantage of defining Set x is that the measurement event can also be defined with reference to Set x.

Set x is defined according to one or more alternatives. In a first alternative, the Set x is equivalent to the CoMP measurement set (RRC configured). Set x is updated when the CoMP measurement set is reconfigured.

In a second alternative, the Set x includes x TPs with the highest RSRP/RSRQ measurement results. Set x is updated by the network and the UE e.g., upon triggering of an event. A TP within the Set x is replaced by another TP outside of the Set x with a higher RSRP/RSRQ value. RRC configures the value x (the size of the Set x).

In a third alternative, the Set x includes a CoMP measurement set plus another set of TPs (Set y) corresponding to the TPs with the highest RSRP/RSRQ value outside of the CoMP measurement set. Set x is updated by the network and the UE e.g., upon triggering of an event. A TP within the set y can be replaced by another TP outside of the Set x with a higher RSRP/RSRQ value. RRC configures the value y (the size of the Set y).

In a fourth alternative, the Set x includes the set of TPs with RSRP/RSRQ values that exceed a certain threshold (e.g., configured by RRC). Set x can be updated by the network and the UE e.g., upon triggering of an event. A TP outside of Set x can be added or a TP within a Set x can be removed, according to its RSRP/RSRQ value.

In a fifth alternative, the Set x includes the set of TPs with RSRP/RSRQ values within a certain threshold compared to the strongest TP (e.g., highest RSRP/RSRQ value). Set x is updated by the network and the UE e.g., upon triggering of an event. The threshold is configured by RRC measurements.

Optionally, restriction can be imposed on the TPs included in the Set x. For example, only TPs belonging to an indicated cell or a list of cells is included in the set x.

In one alternative, there is only one Set x maintained by the network and the UE, e.g., the CoMP measurement set. In another alternative, multiple Set x's are maintained by the network and the UE, where each Set x corresponds to different restriction as mentioned previously, or corresponds to a different alternative of Set x definition as described previously. If multiple measurement objects are configured as described in the embodiment of FIG. 6, there is one Set x per measurement object.

Figure 10:
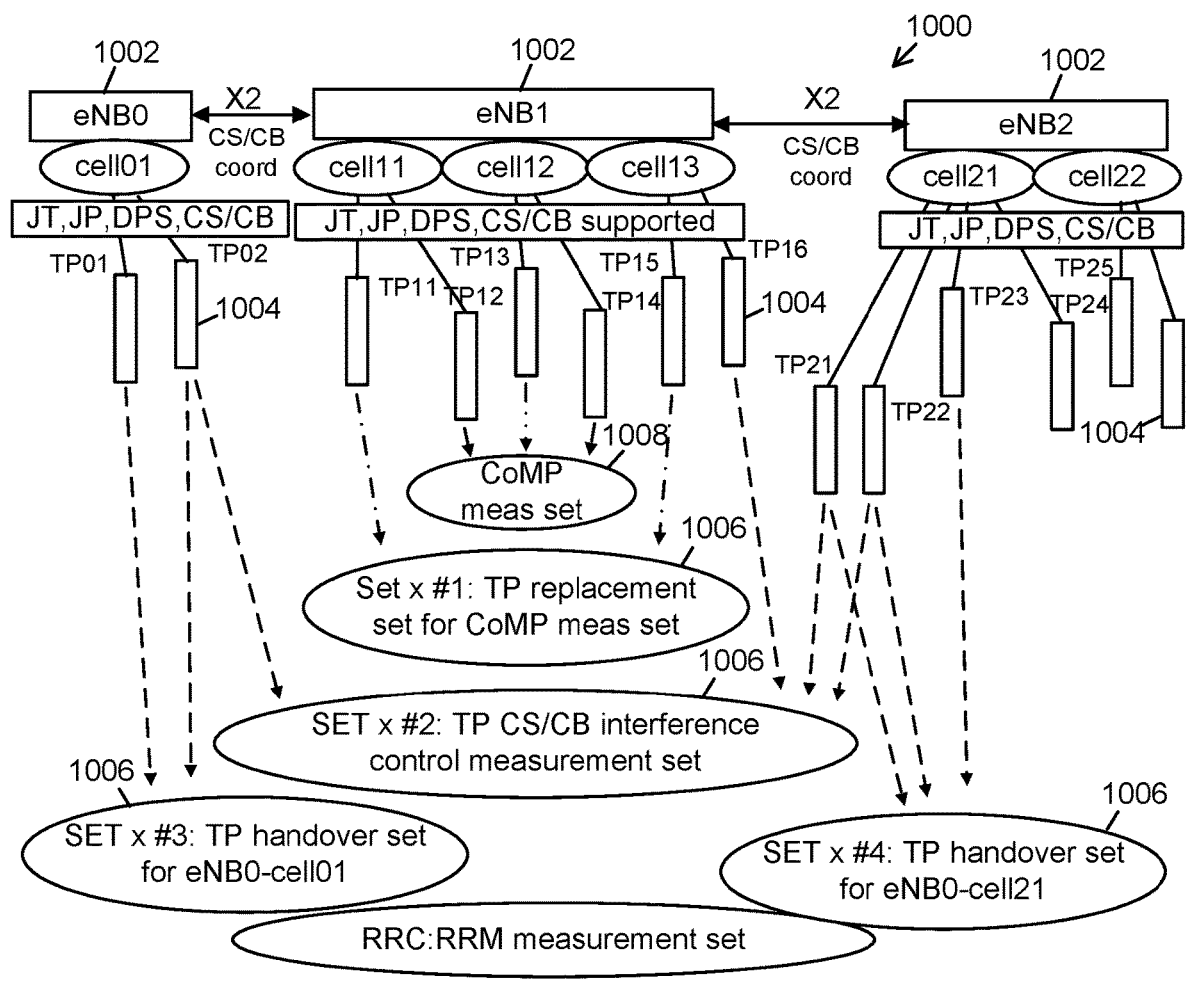
FIG. 10 illustrates an example network showing how multiple CoMP cooperating sets can be used for different purposes according to embodiments of the present disclosure.

FIG. 10 illustrates an example network 1000 showing how multiple CoMP set X's 1006 are used for different purposes according to embodiments of the present disclosure. Network 1000 includes a number of base stations 1002 that generates multiple TPs 1004. The diagram shown in FIG. 10 is for illustration only. Other embodiments could be used without departing from the scope of this disclosure.

If the network uses the Set x 1006 as the CoMP cooperating set, multiple Set x's 1006 create multiple CoMP cooperating sets, each cooperating set is used for a different purpose, e.g., to determine the CoMP measurement set 1008, to determine the CS/CB coordination set, or to facilitate CoMP measurement set selection after handover.

In one embodiment, the network configures criteria for measurement report triggering for Type-2 RRM measurement. The UE reports measurement results for one or more applicable TPs when an event is triggered (i.e., conditions for reporting are fulfilled). In this embodiment, events are defined with the purpose of managing the Set x. One or more of the following events can be used. In a first event, which shall be denoted as an event where the signal quality of a TP is reported to be some margin better than the reference TP, a TP outside of Set x becomes better than threshold. One option for the entering condition and the leaving condition are defined as shown in Equations 23 and 24 respectively:

$$Mcp-Hys > \text{Thresh} \qquad [\text{Eqn. 23}]$$

$$Mcp+Hys < \text{Thresh} \qquad [\text{Eqn. 24}]$$

where Mcp is the measurement result of the TP concerned, not taking into account any offsets. Hys is the hysteresis parameter for this event. Thresh is the threshold parameter for this event. Mcp is expressed in dBm in case of RSRP, or in dB in case of RSRQ. Hys are expressed in dB. In another option, TP offsets are also included to allow TP-specific fine-tuning, and the entering condition and the leaving condition are defined by Equations 25 and 26:

$$Mcp+Opcp-Hys > \text{Thresh} \qquad [\text{Eqn. 25}]$$

$$Mcp+Opcp+Hys < \text{Thresh} \qquad [\text{Eqn. 26}]$$

where Mcp is the measurement result of the TP concerned, not taking into account any offsets. Opcp is the TP specific offset or cell-specific offset or (TP-specific offset+cell-specific offset) of the TP concerned. Hys is the hysteresis parameter for this event. Thresh is the threshold parameter for this event. Mcp is expressed in dBm in case of RSRP, or in dB in case of RSRQ. Opcp and Hys are expressed in dB.

Upon triggering of the event, the UE sends a measurement report that can include initiating a measurement report procedure. The measurement report includes the identity(ies) of the TP(s) that triggered the event and its (their) corresponding measurement result(s), e.g., RSRPs.

In a second event, the TP outside of Set x has an offset that becomes better than a reference TP within Set x. In this manner, the UE can report if the signal quality of a TP outside of Set x has become an offset within that of a reference TP (entering) or has become an offset worse than that of a reference TP (leaving).

The reference TP with Set x functions according to one or more alternatives. In a first alternative, the weakest TP within Set x (TP with the lowest RSRP value, measured based on the CSI-RS) is tuned for CoMP measurement set management. For example, if Set x is the CoMP measurement set, whenever a TP considered for RRM measurement not in the CoMP measurement set has an offset that becomes a threshold better than the worst TP from the CoMP measurement set, the UE reports this TP.

Embodiments using an alternative such as this have certain advantages. For example, if Set x is the CoMP measurement set, the indicated event does not in itself limit the CoMP measurement size; the base station can still decide how many TP's are included in the CoMP measurement set, for example by adding a TP to the CoMP measurement set and not removing the lowest quality TP such that the TPs in the Set x are increased by one. Another advantage includes, by removing the lowest quality TP from the CoMP measurement set (based on PUCCH reporting), the CoMP measurement size and the Set x are reduced by one. Yet another advantage includes, if the quality of the TPs in the CoMP measurement set starts to differ, the base station removes the lower quality TPs from the CoMP measurement set. The event will then report them again when they are relevant for the CoMP measurement set.

At reconfiguration of the CoMP measurement set, a TP previously reported with the event is added to the CoMP measurement set. Then the previously reported TP can be removed from the cellTriggeredList of the event so that the previously reported TP is not reported again. At handover, the celltriggeredlist should be cleared, and all TPs in (new) RRM measurement set are evaluated again for reporting against the new CoMP measurement set.

In a second alternative, a specific TP within Set x is configured by RRC. This gives the network the full control on which TP is to be considered as the reference TP.

In a third alternative, the reference TP is the strongest TP within Set x (e.g., the TP with the highest RSRP value, measured based on the CSI-RS). If Set x is the CoMP measurement set, the reference TP can be tuned as described above. The Set x includes TPs not intended to enter the CoMP measurement set, but are still used by the base station to be continually aware of their quality, such as for SSPS or relevance after handover. Upon a change of the reference TP, all TPs considered for RRM measurement are reevaluated for their reporting conditions.

One option for the entering condition and the leaving condition are defined as shown in Equations 27 and 28 respectively:

$$Mcp-Hys>Mrp+Off \quad \text{[Eqn. 27]}$$

$$Mcp+Hys<Mrp+Off \quad \text{[Eqn. 28]}$$

Mcp is the measurement result of the TP concerned, not taking into account any offsets. Mrp is the measurement result of the reference TP, not taking into account any offsets. Hys is the hysteresis parameter for this event. Off is the offset parameter for this event. Mcp and Mrp are expressed in dBm in case of RSRP, or in dB in case of RSRQ. Hys, Off are expressed in dB.

In another option, TP offsets are also included to allow TP-specific fine-tuning, and the entering condition and the leaving condition are defined as shown in Equations 29 and 30 respectively:

$$Mcp+Opcp-Hys>Mrp+Oprp+Off \quad \text{[Eqn. 29]}$$

$$Mcp+Opcp+Hys<Mrp+Oprp+Off \quad \text{[Eqn. 30]}$$

when Mcp is the measurement result of the TP concerned, not taking into account any offsets. Opcp is the TP specific offset or cell-specific offset or (TP-specific offset+cell-specific offset) of the TP concerned. Mrp is the measurement result of the reference TP, not taking into account any offsets. Oprp is the TP specific offset or cell-specific offset or (TP-specific offset+cell-specific offset) of the reference TP. Hys is the hysteresis parameter for this event. Off is the offset parameter for this event. Mcp and Mrp are expressed in dBm in case of RSRP, or in dB in case of RSRQ. Opcp, Oprp, Hys, and Off are expressed in dB.

Upon triggering of the event, the UE sends a measurement report that can include initiating a measurement report procedure. The measurement report includes the identity(ies) of the TP(s) that triggered the event and its (their) corresponding measurement result(s), and the identity of the reference TP. However, the identity of the reference TP may not be needed if the reference TP is RRC configured.

In a third event, a TP within Set x has an offset that becomes worse than a threshold. In this case, the entering condition and the leaving condition are defined as shown in Equations 31 and 32 respectively:

$$Mcp+Hys<Thresh \quad \text{[Eqn. 31]}$$

$$Mcp-Hys>Thresh \quad \text{[Eqn. 32]}$$

when Mcp is the measurement result of the TP concerned, not taking into account any offsets. Hys is the hysteresis parameter for this event. Thresh is the threshold parameter for this event. Mcp is expressed in dBm in case of RSRP, or in dB in case of RSRQ. Hys is expressed in dB.

Upon triggering of the event, the UE sends a measurement report that can include initiating a measurement report procedure. The measurement report includes the identity(ies) of the TP(s) that triggered the event and its (their) corresponding measurement result(s), e.g., RSRPs.

For all events described above, multiple reporting configurations of the same event with different parameter values can be configured by the network. For all events described above, the UE sends measurement report when the entering condition is fulfilled. For all events described above, the UE sends a measurement report when the leaving condition is fulfilled. Alternatively, sending a measurement report when the leaving condition is fulfilled is configurable, that is, a 'report on leave' condition can be configured to inform the network when a TP fulfils the specified leaving condition.

Optionally, upon fulfilling the entering condition of an event, the UE is configured to perform periodic measurement reporting of the TP(s) that triggered the event and other relevant report content for the event.

Note that the TP identity in the measurement report is either represented by the CSI-RS configuration index and the CSI-RS subframe configuration index, or by a TP index, which maps to a CSI-RS configuration and CSI-RS subframe configuration.

In one embodiment, the measurement report is triggered by L1 signaling, such as by using one bit in a DCI format. If Set x is defined, for example as the CoMP measurement set, the measurement reports for all TPs within the Set x are sent by the UE upon the L1 triggering. In one embodiment, when handover is triggered to a target cell, the UE is requested to report the strongest k TPs (which can be higher than a certain threshold) within the Type-2 RRM measurement which belong to the target cell, where k is an integer that can be configured by RRC or can be fixed. Results are passed to a target base station so that the target base station can configure, for example, the CoMP measurement set or CoMP coordinating set after the handover.

In one embodiment, a TP is represented as a CSI-RS resource. Therefore, TP and CSI-RS resource are sometimes used interchangeably. If a network deployed with TPs with one-port CSI-RS resource as well as TPs with multiple-port CSI-RS resource (e.g., 2 ports), the power of the TP with one port can be higher than the power of the TP with multiple ports if the network fully utilizes the same total transmit power at each TP, e.g., the power of the TP with one port (e.g., port 15) can be 3 dB higher than the power of TP with 2 ports (e.g., port 15 & 16). As a result, the RSRP measurement result of the one-port TP can also be 3 dB higher than the 2-port TP since RSRP is defined per antenna port (it is noted that the assumption here is that when measuring the RSRP of a CSI-RS resource with multiple ports, the RSRP is obtained by averaging the measurement results over the multiple ports). However in another implementation case, the UE only always measures one CSI-RS port, port 15, regardless of the actual number of the CSI-RS ports of the TP). It can be desirable to compensate the 3 dB power imbalance when comparing results measured from one-port TP and two-port TP, since it is the comparison of total power from all ports that is more important when determining the CoMP measurement set. One method to compensate for the power imbalance is for the network to configured TP-specific (or CSI-RS resource-specific) offset as described above with reference to FIG. 7. For example, for the entering condition for the first event can be defined by Equation 33:

$$Mcp+Opcp-Hys>Mrp+Oprp+Off \qquad \text{[Eqn. 33]}$$

Opcp is configured to be 3 dB if the candidate TP (corresponding to Mcp) is a two-port (or multi-port) TP and Oprp is configured to be 0 dB for the reference TP (corresponding to Mrp) is a one port TP. More generally, Opcp and Oprp is configured such that Opcp−Orcp is 3 dB if the candidate TP is a two-port TP and the reference TP is a one-port TP. Similarly, if Opcp and Oprp are configured such that Oprp−Opcp is 3 dB if the candidate TP is a one-port TP and the reference TP is a two-port TP. Clearly, if the two TPs have the same number of TPs, then Opcp and Oprp are configured the same value (e.g., 0 dB or 3 dB).

Similar compensation using TP-offset can also be configured for the leaving condition and is omitted here as it is straightforward.

Power imbalance can also be taken into account according to Equation 34:

$$Mcp+Opcp-Hys>\text{Thresh} \qquad \text{[Eqn. 34]}$$

Opcp for a two-port (or multi-port) TP is configured to be 3 dB and Opcp for a one-port TP is configured to be 0 dB.

Similar compensation using TP-offset also can be configured for the leaving condition and is omitted here as it is straightforward. While a 3 dB difference between TPs has been used as examples, it is generally up to the network what value of TP specific offset the network wishes to configure.

Upon triggering of the event, the UE sends the original RSRP result. As the network is aware of the offset it configures, the network compares the RSRP results for TPs fairly. Alternatively, the UE can also send the RSRP plus the offset value applied when assessing the triggering condition (excluding Hys). In this case, the network does not need to keep track of its own offset configuration for each TP when comparing the RSRP results for TPs.

A second method to compensate the power imbalance includes, when the UE measures the CSI-RS resources of TPs with different number CSI-RS ports, the UE adjusts the RSRP results for each TP separately, depending upon the number of the CSI-RS ports in each CSI-RS resource, to determine if an event has been triggered and the report should be sent. Upon triggering of an event, the UE sends the report post compensation. Alternatively, the UE sends the report prior to compensation, in which case the network keeps track of the number of CSI-RS ports for the TPs measured/reported by the UE for fair comparison.

More specifically, the following measurement compensation methods can be used. In a first compensation method, the UE adds −3 dB to the RSRP result measured from one-port TP, but does not perform such additional compensation to the RSRP result measured from two-port TP (or multi-port TP). Equivalently, the UE sets Opcp (or Oprp) as −3 dB for one-port TP and sets Opcp (or Oprp) as 0 dB for two-port TP (or multi-port TP).

In a second compensation method, the UE adds 3 dB to the RSRP result measured from two-port TP (or multi-port TP), but does not perform such additional compensation to the RSRP result measured from one-port TP. Equivalently, the UE sets Opcp (or Oprp) as 0 dB for one-port TP and sets Opcp (or Oprp) as 3 dB for two-port TP (or multi-port TP).

In a third compensation method, if a measurement event such as the TP having an offset that becomes better than a reference TP occurs, the UE performs adjustment to the target TP that is compared against the reference TP (e.g., strongest TP) as follows. If the reference TP is a one-port TP, the UE adds 3 dB to the RSRP result measured from two-port TP (or multi-port TP), but does not perform such additional compensation to the RSRP result measured from one-port TP. Equivalently, the UE sets Oprp=0 dB and sets Opcp as 3 dB for two-port TP and Opcp as 0 dB for one-port TP.

If the reference TP is a two-port TP (multi-port TP), the UE adds −3 dB to the RSRP result measured from one-port TP, but does not perform such additional compensation to the RSRP result measured from two-port TP (or multi-port TP). Equivalently, the UE sets Oprp=0 dB and sets Opcp as 0 dB for two-port TP and Opcp as −3 dB for one-port TP.

If the reference TP is defined as the strongest TP, the UE determines the strongest TP taking into account the power imbalance. The strongest TP can be defined as the TP with the highest effective RSRP (RSRPeff). For example RSRPeff can be defined as:

RSRPeff=RSRP+3 dB, for CSI-RS resource configured with more than one CSI-RS port.

RSRPeff=RSRP, for CSI-RS resource configured with one CSI-RS port.

Or

RSRPeff=RSRP, for CSI-RS resource configured with more than one CSI-RS port.

RSRPeff=RSRP-3 dB, for CSI-RS resource configured with one CSI-RS port.

In another example, RSRPeff of the strongest TP can be defined by including the offset configured, e.g., RSRPeff (ref)=Mrp+Oprp; and RSRPeff of the other TP (candidate TP) can be defined as RSRPeff=Mcp+Opcp.

A third method to compensate the power imbalance is that the power offset that should be assumed by the UE when measuring the CSI-RS of a port is indicated as part of the CSI-RS resource configuration. For example. TP #1's CSI-RS resource configuration include power offset value 1 (dB) and TP #2's CSI-RS resource configuration include power offset value 2 (dB). The RSRP measured from the TP #1 is defined as raw RSRP measured from TP #1 (dBm)+power offset value 1 (dB) and The RSRP measured from the TP #2 is defined as raw RSRP measured from TP #2 (dBm)+power offset value 2 (dB). Some examples of possible of power offset values are {0 dB, 3 dB}, {0 dB, −3 dB} or {−3 dB, 0 dB, 3 dB}. An alternative design for this third method is that the power offset value need not be explicitly configured by the network but can be derived by the UE depending on the number of antenna ports configured for the CSI-RS resource concerned, i.e., 0 dB for CSI-RS resource configured with more than one CSI-RS port and −3 dB, for CSI-RS resource configured with one CSI-RS port.

As an example of the third method, when taking into account the configured power offset, the entering condition when a TP has an offset that becomes better than a reference TP is as shown in Equation 35:

$$Mcp+POcp+Opcp-Hys>Mrp+POrp+Oprp+Off \qquad \text{[Eqn. 35]}$$

where POcp is the power offset configured for the candidate TP measured and POrp is the power offset configured for the reference TP. Here, Opcp and Oprp are separate configurable TP-specific offsets which may not be relevant to compensation of power imbalance of TPs.

The power offset when the TP has an offset that becomes better than a threshold is similar to when the offset of the TP becomes better than a reference TP as described above with reference to FIG. 7.

In this case, the entering condition is defined as shown in Equation 36:

$$Mcp+POcp+Opcp-Hys>\text{Thresh} \qquad [\text{Eqn. 36}]$$

Similar equations can be shown for the leaving conditions for the previously described events.

If the reference TP is defined as the strongest TP, the UE shall determine the strongest TP taking into account the configured power offset. The strongest TP can be defined as the TP with the highest effective RSRP (RSRPeff) given by RSRPeff=RSRP measured based on CSI-RS of the reference TP+Power Offset Value configured for the reference TP.

Upon triggering of the event, the UE sends the original RSRP result. As the network is aware of the offset it configures, the network can compare the RSRP results for TPs fairly. Alternatively, the UE sends the RSRP plus the offset value applied when assessing the triggering condition (excluding Hys). In this case, the network does not need to keep track of its own offset configuration for each TP when comparing the RSRP results for TPs.

Power imbalance of TPs described in this embodiment may not occur, e.g., if the power of each CSI-RS port is the same across all TPs, therefore network signaling can be beneficial to indicate whether the UE should perform measurement compensation as described in this embodiment, e.g., via higher layer signaling such as RRC.

So far, the assumption has been that when measuring the RSRP of a CSI-RS resource with multiple ports, the RSRP is obtained by averaging the measurement results over the multiple ports. As a fourth method to compensate the power imbalance, it is also possible to change the definition of RSRP based on CSI-RS measurement such that if port 15 and 16 are configured for measurement, the RSRP is the sum of the power measured over the antenna ports 15 and 16. For example the RSRP for CSI-RS (CSI-RSRP) can be defined as:

Channel-State Information-Reference Signal Received Power (CSI-RSRP) is defined as the linear average over the power contributions (in Watts [W]) of the resource elements that carry channel-state information reference signals within the considered measurement frequency bandwidth.

For CSI-RSRP, the channel-state information reference signals R15 according TS 36.211 ("REF3") is used. If R16 is also configured, the UE uses R16 in addition to R15 to determine CSI-RSRP by summing the measurement determined from R15 and the measurement determined from R16.

In certain embodiments, the UE is configured to perform measurement reporting to assist E-UTRAN with the configuration of CoMP resources, also referred to as the CoMP measurement set. In particular, the UE is configured to measure and report a set of CSI-RS resources, also referred to as the CoMP Resource Management (CRM) Set. The management of CoMP resources is independent of existing mobility measurements and procedures. E-UTRAN also uses other measurements, such as mobility measurements or SRS, for the management of the CoMP measurement set.

With respect to CSI-RS resource configuration for CRM:
The UE is only required to measure and report on CSI-RS resources that are explicitly configured by E-UTRAN, i.e., the UE is not required to autonomously detect CSI-RS resources.
The CSI-RS resources in the CRM set are configured independently from the CoMP measurement set
The CRM set is configured as part of a measurement object.

With respect to CRM measurement reporting:
The UE provides CSI-RSRP measurement results
At least event periodic and/or triggered reporting is supported.
Event triggers are either absolute (i.e., compared to a threshold) or relative (i.e., compared to another CSI-RS resource e.g., the best resource in the CRM).

The parameters needed to support CSI-RSRP measurements were agreed by RAN1 as follows:
For the purpose of the CSI-RSRP measurement, each CSI-RS resource in the CoMP Resource Management Set needs the following parameters:
AntennaPortsCount,
ENUMERATED {an1, an2, an4, an8}
ResourceConfig,
INTEGER (0 . . . 31)
SubframeConfig,
INTEGER (0 . . . 154)
Scrambling initialization parameter
INTEGER (0 . . . 503)

Figure 11:
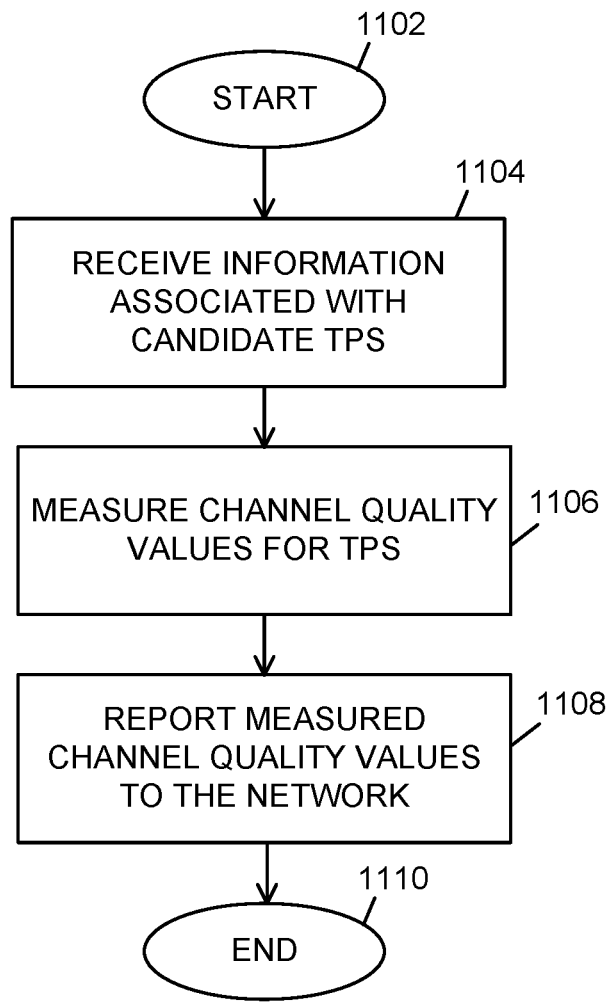
FIG. 11 illustrates one example of a process for coordinated multipoint (CoMP) transmission in a wireless communication network.

In the following embodiment, a TP is represented as a CSI-RS resource. Therefore, TP and CSI-RS resource are sometimes used interchangeably. A CSI-RS resource includes at least the following parameters:
AntennaPortsCount
ResourceConfig
SubframeConfig
Scrambling initialization parameter FIG. 11 illustrates one example of process for coordinated multipoint (CoMP) transmission in a wireless communication network. In step 1102, the process is initiated.

In step 1104, information associated with one or more TPs that are candidates for coordinated multipoint (CoMP) transmission with a UE are received. In one embodiment, the UE performs measurements based on CRS and measurement based on CSI-RS concurrently. That is, the UE performs measurements of TPs of base stations that operate according to Releases 8, 9, and 10 of the 3GPP specification as well as base stations that operate according to Release 10 and 11 of the 3GPP specification.

In one embodiment, the information includes a list of TPs (i.e., a white list) in which the UE is only required to try to detect, measure or report the TPs in the list. One particular advantage that can be provided by the white list is that the UE is not required to detect, measure, or report TPs that are not listed, which could potentially include many TPs. This alternative also reduces the latency of TP detection, which can be large especially for UE with low geometry.

In another alternative, the information additionally includes list of TPs (i.e, a black list) in which the UE is not required or not allowed to detect, measure, or report the black-listed TPs. The UE should, however, attempt to detect, measure, or report any other unlisted TPs. In another alternative, the information includes a priority list in which the UE is required to initially attempt to detect, measure, or report the TPs listed. The UE is also allowed to detect, measure, or report any other unlisted TPs that it can find. Optionally, a black list of TPs can also be provided so that the UE is not required or is not allowed to detect, measure, or report the black-listed TPs.

In step 1106, channel quality values are measured for each of the TPs designated in step 1104. In certain embodiments, the channel quality values are measured according to one or more measurement objects that each specify a different set of TPs and their associated parameters. Each measurement object is also linked with different report configurations. This can provide the UE measurement and reporting behavior to be customized according to the purpose of the measurement applicable to the configured measurement object. The measurement objects may or may not contain overlapping set of TPs.

In certain embodiments, the channel quality values are adjusted according to whether the TP is a one-port TP or a two-port TP. In some cases, TPs with a one-port CSI-RS resource transmit with higher output power than TPs with a two-port CSI-RS resource. Thus, the increased power output provided by the one-port TP can be compensated for when measuring two-port TPs.

In step 1108, the channel quality values measured in step 1106 are reported to the network. In certain embodiments, The UE reports measurement results for one or more applicable TPs when an event is triggered, that is, conditions for reporting are fulfilled. One or more events can be used. A first event can include where the TP increases to have an offset better than a reference TP. In this manner, the UE reports if the signal quality of a TP has an offset within that of a reference TP, such as a UE entering a cell, or has become an offset worse than that of a reference TP, such as a UE leaving a cell. If the reference TP is configured by the network, the event is also used to report if the signal quality of a TP that has some offset better than that of a reference TP (e.g., for detecting the strongest TP). Another event can include one in which the TP becomes better than a threshold.

The aforementioned process continues throughout operation of the CoMP measurement process. When use of the CoMP measurement process is no longer needed or desired, processing ends at step 1110.

Although FIG. 11 illustrates an example of a method for mapping synchronization signals, various changes can be made to FIG. 11. For example, while shown as a series of steps, the steps in each figure could overlap, occur in parallel, occur in a different order, or occur any number of times.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A base station for measurement configuration in a wireless communication system, the base station comprising:
    a transceiver; and
    a controller configured to:
        transmit, to a user equipment (UE) via the transceiver, measurement configuration information including frequency information and channel state information reference signal (CSI-RS) information, the CSI-RS information including
            a physical cell identifier (ID),
            a CSI-RS index, and
            information for generation of a CSI-RS sequence,
        transmit, to the UE via the transceiver, report configuration information including a threshold for an event, and
        receive, from the UE via the transceiver, a measurement report for the event that is generated based on
            a measured reference signal received power (RSRP) of the CSI-RS according to the measurement configuration information, and
            the threshold according to the report configuration information.

2. The base station of claim 1, wherein the CSI-RS information further includes information on transmission timing for the CSI-RS.

3. The base station of claim 1, wherein the measurement configuration information further includes a cell individual offset for the threshold for the event.

4. The base station of claim 1, wherein the CSI-RS information is in a list of CSI-RS information included in the measurement configuration information.

5. The base station of claim 1, wherein the measurement report is generated in case that a measurement result of CSI-RS becomes better than the threshold.

6. A method for measurement configuration by a base station in a wireless communication system, the method comprising:
    transmitting, to a user equipment (UE), measurement configuration information including frequency information and channel state information reference signal (CSI-RS) information, the CSI-RS information including
        a physical cell identifier (ID),
        a CSI-RS index, and
        information for generation of a CSI-RS sequence;
    transmitting, to the UE, report configuration information including a threshold for an event; and
    receiving, from the UE, a measurement report for the event that is generated based on
        a measured reference signal received power (RSRP) of the CSI-RS according to the measurement configuration information, and
        the threshold according to the report configuration information.

7. The method of claim 6, wherein the CSI-RS information further includes information on transmission timing for the CSI-RS.

8. The method of claim 6, wherein the measurement configuration information further includes a cell individual offset for the threshold for the event.

9. The method of claim 6, wherein the CSI-RS information is in a list of CSI-RS information included in the measurement configuration information.

10. The method of claim 6, wherein the measurement report is generated in case that a measurement result of the CSI-RS becomes better than the threshold.

11. A user equipment (UE) for measurement in a wireless communication system, the UE comprising:
    a transceiver; and
    a controller and configured to:
        receive, from a base station via the transceiver, measurement configuration information including frequency information and channel state information reference signal (CSI-RS) information, the CSI-RS information including
a physical cell identifier (ID),
a CSI-RS index, and
information for generation of a CSI-RS sequence,
receive, from the base station via the transceiver, report configuration information including a threshold for an event, and
perform, via the transceiver, measurement reporting for the event based on
a measured reference signal received power (RSRP) of the CSI-RS according to the measurement configuration information, and
the threshold according to the report configuration information.

12. The UE of claim 11, wherein the CSI-RS information further includes information on transmission timing for the CSI-RS.

13. The UE of claim 11, wherein the measurement configuration information further includes a cell individual offset for the threshold for the event.

14. The UE of claim 11, wherein the CSI-RS information is in a list of CSI-RS information included in the measurement configuration information.

15. The UE of claim 11, wherein the measurement reporting is triggered in case that a measurement result of the CSI-RS becomes better than the threshold, wherein the measurement reporting comprises transmitting a measurement report to the base station via the transceiver.

16. A method for measurement by a user equipment (UE) in a wireless communication system, the method comprising:
receiving, from a base station, measurement configuration information including frequency information and channel state information reference signal (CSI-RS) information, the CSI-RS information includes
a physical cell identifier (ID),
a CSI-RS index, and
information for generation of a CSI-RS sequence;
receiving, from the base station, report configuration information including a threshold for an event; and
performing measurement reporting for the event based on
a measured reference signal received power (RSRP) of the CSI-RS according to the measurement configuration information, and
the threshold according to the report configuration information.

17. The method of claim 16, wherein the CSI-RS information further includes information on transmission timing for the CSI-RS.

18. The method of claim 16, wherein the measurement configuration information further includes a cell individual offset for the threshold for the event.

19. The method of claim 16, wherein the CSI-RS information is in a list of CSI-RS information included in the measurement configuration information.

20. The method of claim 16, wherein the measurement reporting is triggered in case that a measurement result of the CSI-RS becomes better than the threshold.

* * * * *